US012637528B2

(12) United States Patent (10) Patent No.: US 12,637,528 B2
El-Toufaili et al. (45) Date of Patent: May 26, 2026

(54) PROCESS AND PLANT FOR MANUFACTURING AQUEOUS POLYACRYLAMIDE GELS

(71) Applicant: BASF SE, Ludwigshafen am Rhein (DE)

(72) Inventors: Faissal-Ali El-Toufaili, Ludwigshafen am Rhein (DE); Daniel Barrera-Medrano, Ludwigshafen am Rhein (DE); Dennis Loesch, Ludwigshafen am Rhein (DE); Anna-Corina Schmidt, Trostberg (DE); Kristian Alexander Gill, Ludwigshafen am Rhein (DE); Tobias Joachim Zimmermann, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 798 days.

(21) Appl. No.: 17/913,449

(22) PCT Filed: Mar. 18, 2021

(86) PCT No.: PCT/EP2021/056925
§ 371 (c)(1),
(2) Date: Sep. 22, 2022

(87) PCT Pub. No.: WO2021/191041
PCT Pub. Date: Sep. 30, 2021

(65) Prior Publication Data
US 2023/0128528 A1 Apr. 27, 2023

(30) Foreign Application Priority Data
Mar. 26, 2020 (WO) ................. PCT/EP2020/058565

(51) Int. Cl.
*C08F 220/06* (2006.01)
*B01J 13/00* (2006.01)
*C08F 220/56* (2006.01)

(52) U.S. Cl.
CPC ......... *C08F 220/56* (2013.01); *B01J 13/0065* (2013.01); *C08F 220/06* (2013.01); *C08F 2800/10* (2013.01)

(58) Field of Classification Search
CPC .. C08F 220/56; C08F 220/06; C08F 2800/10; C08F 2/01
See application file for complete search history.

(56) References Cited

U.S. PATENT DOCUMENTS

| | | | |
|---|---|---|---|
| 4,605,689 | A | 8/1986 | Witheford et al. |
| 6,455,732 | B1 | 9/2002 | Aichinger et al. |
| 2007/0076840 | A1 | 4/2007 | Beati et al. |

FOREIGN PATENT DOCUMENTS

| | | | | |
|---|---|---|---|---|
| AU | 2010251271 | A1 | 11/2011 | |
| CA | 3076545 | A1 * | 5/2019 | ............... C08F 2/01 |
| CN | 109207138 | A | 1/2019 | |
| CN | 109847679 | A | 6/2019 | |
| DE | 19923389 | A1 | 8/2000 | |
| KR | 10-2019-0089612 | A | 7/2019 | |
| WO | 2008/116840 | A1 | 10/2008 | |
| WO | 2009/021921 | A1 | 2/2009 | |
| WO | 2010/133527 | A2 | 11/2010 | |
| WO | 2012/069478 | A1 | 5/2012 | |
| WO | 2015/086468 | A1 | 6/2015 | |
| WO | 2017/186685 | A1 | 11/2017 | |
| WO | 2017/186697 | A1 | 11/2017 | |
| WO | 2017/186698 | A1 | 11/2017 | |
| WO | 2019/081318 | A1 | 5/2019 | |
| WO | 2019/081319 | A1 | 5/2019 | |
| WO | 2019/081320 | A1 | 5/2019 | |
| WO | 2019/081321 | A1 | 5/2019 | |
| WO | 2019/081323 | A1 | 5/2019 | |
| WO | 2019/081327 | A1 | 5/2019 | |
| WO | 2019/081330 | A1 | 5/2019 | |
| WO | WO-2019081004 | A1 * | 5/2019 | ............. C09K 8/882 |
| WO | 2019/119248 | A1 | 6/2019 | |
| WO | 2020/079119 | A1 | 4/2020 | |
| WO | 2020/079124 | A1 | 4/2020 | |
| WO | 2020/079152 | A1 | 4/2020 | |

OTHER PUBLICATIONS

International Search Report and Written Opinion received for PCT Patent Application No. PCT/EP2021/056925, mailed on Apr. 26, 2021, 12 pages.
International Search Report for PCT Patent Application No. PCT/EP2020/058565, Issued on Nov. 4, 2020, 4 pages.

* cited by examiner

*Primary Examiner* — Karuna P Reddy
(74) *Attorney, Agent, or Firm* — Faegre Drinker Biddle & Reath LLP

(57) ABSTRACT
Process and a plant for making polyacrylamides by polymerizing an aqueous solution comprising at least acrylamide and acrylic acid or salts thereof in the presence of initiators for radical polymerization under adiabatic conditions, wherein acrylamide and acrylic acid are stored at the site of the plant as dilute aqueous solutions in pressure-resistant tanks and also the monomer mixing vessel and the polymerization vessel are pressure-resistant. The combination of using diluted monomer solutions and pressure-resistant tanks ensures that even in case of an unintended and uncontrolled polymerization, said vessels don't burst and there is no spill out of the plant to the environment.

21 Claims, 4 Drawing Sheets

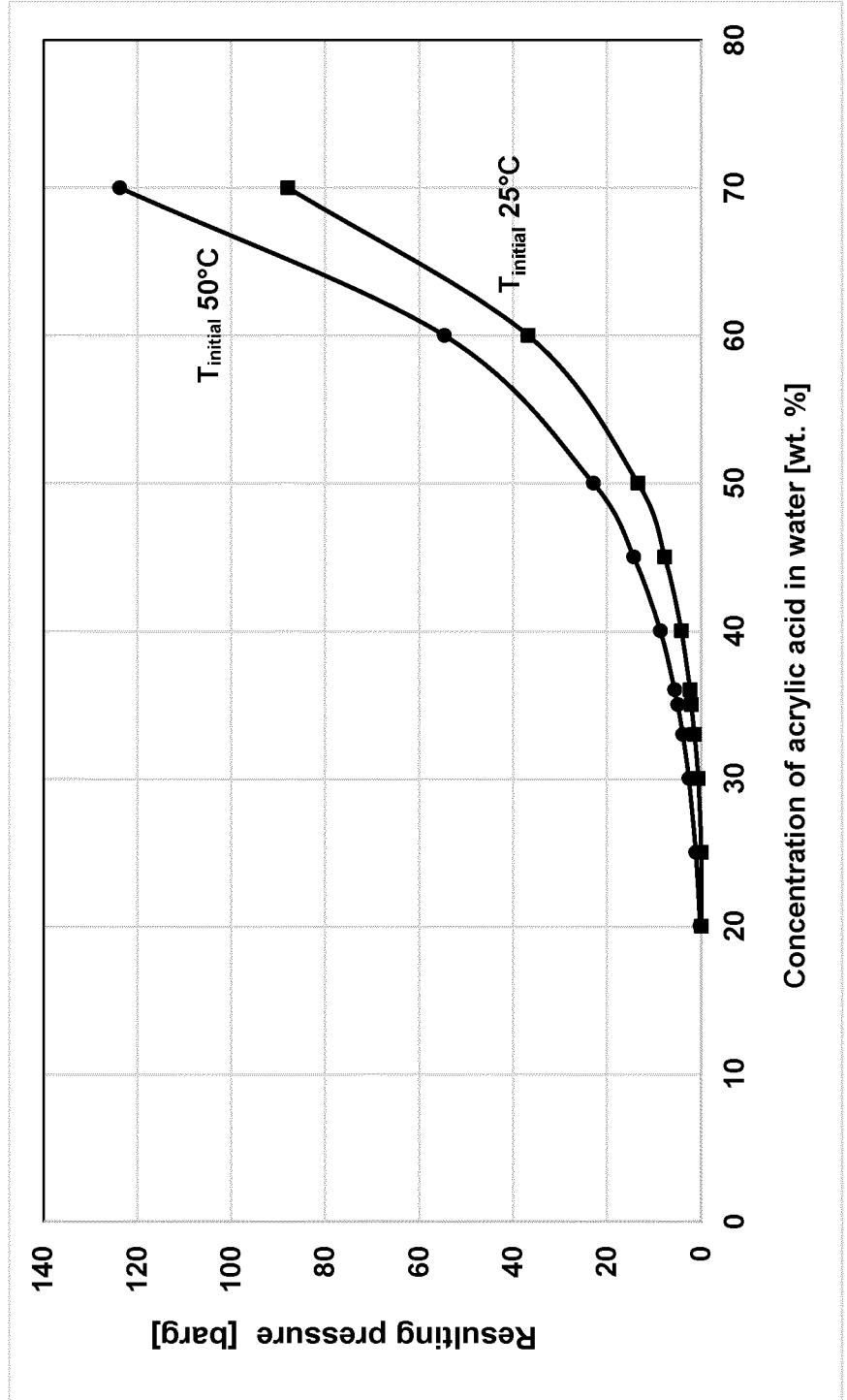
Figure 1: Vapor pressure of an aqueous solution of acrylic acid after polymerization

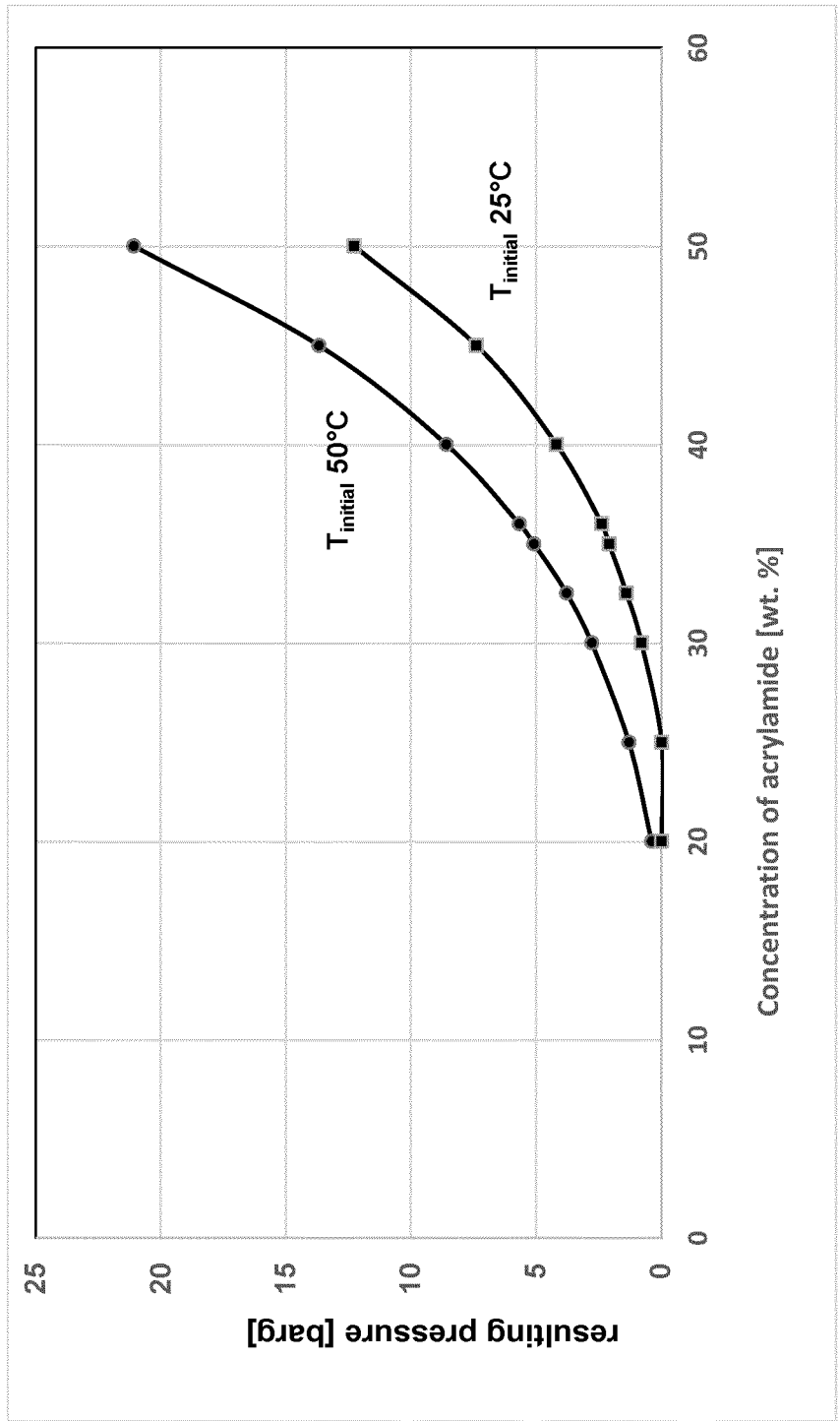
Figure 2: Vapor pressure of an aqueous solution of acrylamide after polymerization

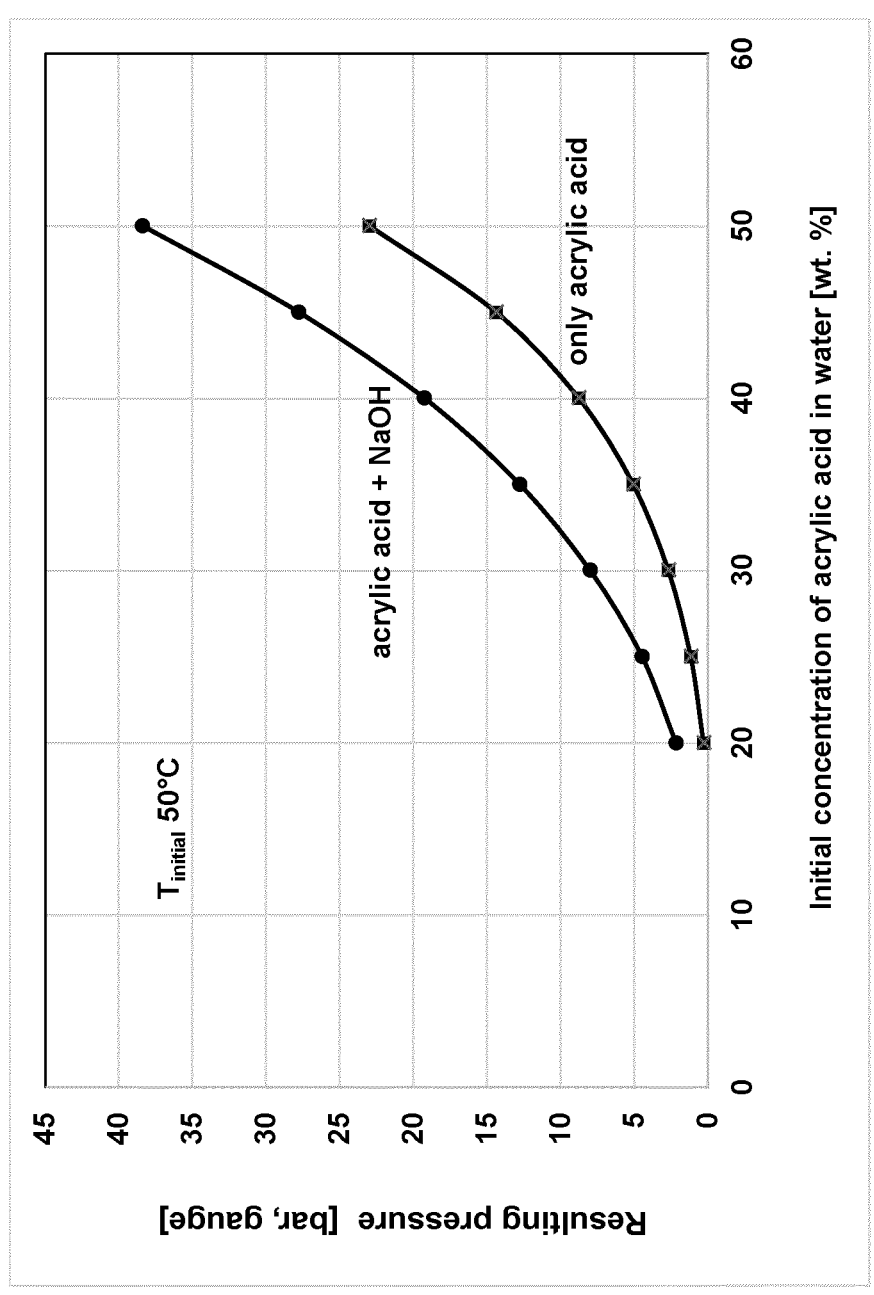
Figure 3: Vapor pressure of an aqueous solution of acrylic acid after adiabatic polymerization, with and without neutralization using aqueous NaOH (50 wt.%), initial temperature 50°C

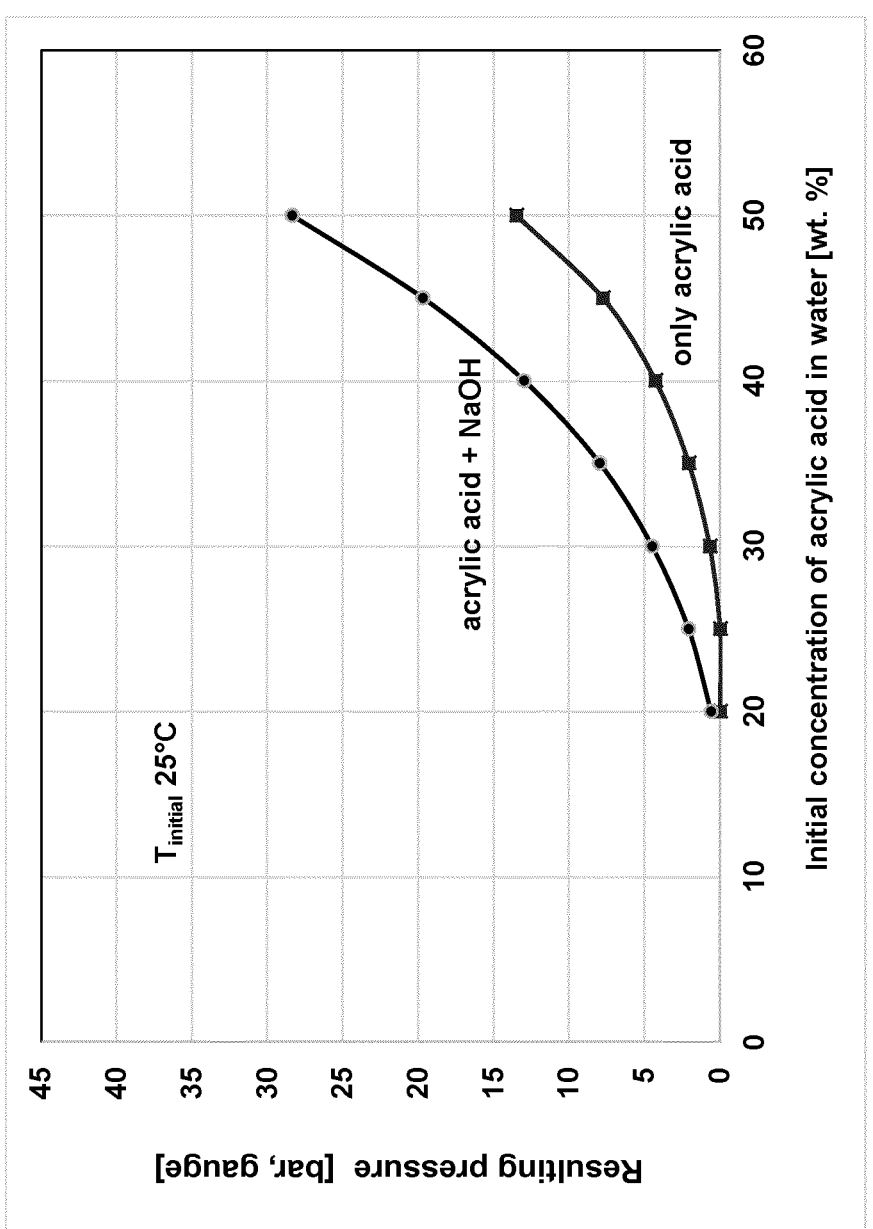
Figure 4: Vapor pressure of an aqueous solution of acrylic acid after adiabatic polymerization, with and without neutralization using aqueous NaOH (50 wt.%), initial temperature 25°C

PROCESS AND PLANT FOR MANUFACTURING AQUEOUS POLYACRYLAMIDE GELS

CROSS-REFERENCE TO RELATED APPLICATIONS

This application is a national stage application (under 35 U.S.C. § 371) of PCT/EP2021/056925, filed Mar. 18, 2021, which claims benefit of European Application No. PCT/EP2020/058565, filed Mar. 26, 2020, both of which are incorporated herein by reference in their entirety.

The present invention relates to a process and a plant for making polyacrylamides by polymerizing an aqueous solution comprising at least acrylamide and acrylic acid or salts thereof in the presence of initiators for radical polymerization under adiabatic conditions, wherein acrylamide and acrylic acid are stored at the site of the plant as dilute aqueous solutions in pressure-resistant tanks and also the monomer mixing vessel and the polymerization vessel are pressure-resistant. The combination of using diluted aqueous monomer solutions and pressure-resistant tanks ensures that even in case of an unintended and uncontrolled polymerization, said vessels don't burst and there is no spill out of the plant to the environment.

Water-soluble, high molecular weight copolymers of acrylamide, acrylic acid and optionally further comonomers may be used for various applications such as mining and oilfield applications, water treatment, sewage treatment, papermaking, and agriculture.

The so called "adiabatic gel polymerization" is a common polymerization technology for manufacturing such high molecular weight polyacrylamide copolymers. In adiabatic gel polymerization, an aqueous monomer solution having a relatively high concentration of monomers, for example from 20% by weight to 50% by weight, is polymerized by means of suitable polymerization initiators under essentially adiabatic conditions in an unstirred reactor thereby forming an aqueous polymer gel. The obtained aqueous polyacrylamide gels may be dried thereby obtaining polyacrylamide powders. Due to its significant water contents, it is very energy extensive to dry such aqueous polyacrylamide gels and the capital expenditure for dryers and further post-processing equipment also is high. For use they need to be re-dissolved in aqueous solvents which is an extra process step requiring suitable equipment.

It is also known in the art to dissolve the gels obtained directly in water and to use the aqueous solutions thereby obtained, for example as disclosed by U.S. Pat. No. 4,605,689.

WO 2017/186697 A1, WO 2017/186698 A1, and WO 2017/186685 A1 disclose several methods of manufacturing aqueous polyacrylamide solutions on-site by hydrolyzing acrylonitrile in water in presence of a biocatalyst thereby obtaining an acrylamide solution, directly polymerizing the acrylamide solution thereby obtaining a polyacrylamide gel, and directly dissolving the polyacrylamide gel by addition of water.

WO 2019/081318 A1, WO 2019/081319 A1, WO 2019/081320 A1, WO 2019/081321 A1, WO 2019/081323 A1, WO 2019/081327 A1, and WO 2019/081330 A1 disclose the manufacture of aqueous polyacrylamide solutions on-site in modular, relocatable plants, by adiabatic gel polymerization of aqueous monomer solutions and dissolving the resultant aqueous polyacrylamide gels. The processes may comprise a step of transporting the gels from one location to another location. Such modular, relocatable plants may be erected for example on an oilfield. If at certain locations aqueous polyacrylamide solutions are no longer needed, the plant may easily become transported to another location where production is resumed.

Our older patent applications WO 2020/079119 A1, WO 2020/079152 A1, and WO 2020/079124 A1 disclose further methods of manufacturing aqueous polyacrylamide solutions or aqueous polyacrylamide concentrates in modular, relocatable plants.

Storing, transporting, handling and polymerizing acrylic acid and acrylamide requires taking precautions against safety hazards.

Acrylic acid is irritating and corrosive. Typically, it is provided and stored as pure compound. Although it is commonly inhibited by inhibitors such as MeHQ, unintended polymerization is one of the greatest hazards of handling acrylic acid. Unintended polymerization—if not stopped in time—may result in a very significant temperature and pressure increase (to up to a few hundred bar) which can lead to the rupture of pipelines, vessels and other containers. In order to prevent an uncontrolled rupture of a storage tank, the top of a storage tank for acrylic acid typically is construed weaker than the side walls, so that in case of unintended polymerization only the top is blasted away. Unintended polymerization may be detected by monitoring the temperature of acrylic acid in a vessel. If it starts to increase, counter measures are possible such as cooling the vessel or diluting the acrylic acid with water.

Acrylamide is toxic. While pure acrylamide is solid, it is typically provided as aqueous solution comprising around 50% by weight of acrylamide. The solution commonly is also stabilized with an inhibitor such as MeHQ. Unintended polymerization of such a solution—if not stopped in time—may also result in a very significant temperature and pressure increase (to up to 15 bar) which can lead to the rupture of pipelines, vessels and other containers. Storing tanks for aqueous acrylamide solutions typically comprise large manholes which open when exceeding a certain pressure, thereby releasing the pressure.

Dealing with incidents of unintended polymerization and environmental hazards connected therewith already is a challenge in large, enclosed chemical plants having the necessary safety infrastructure, for example a plant fire brigade. For modular, relocatable plants as mentioned above which are erected on oilfields or mining areas, i.e. in areas in which the typical safety infrastructure available at large, enclosed chemical areas are not available, dealing with safety hazards requires particular attention.

There are suggestions in prior art for storing and transporting acrylic acid.

DE 199 23 389 A1 discloses a method of storing and/or transporting acrylic acid which comprises adding at least 5 wt. % of water to the acrylic acid and limiting the temperature in course of storing and/or transporting to 15° C.

WO 2008/116840 A1 discloses a method of transporting acrylic acid by transport means or pipelines wherein the acrylic acid has been at least partly neutralized.

WO 2009/021921 A1 discloses a method of making water-absorbent resins, wherein the acrylic acid is manufactured at an acrylic acid production site, the produced acrylic acid is dissolved in water at the production site, the aqueous acrylic acid solution transported through a pipeline to an acrylic acid production site and it is radically polymerized at the production site. The acrylic acid solution preferably comprises 25 to 65 wt. % of acrylic acid, more preferably form 35 wt. % to 55 wt. %.

WO 2019/119248 A1 discloses a method for producing acrylamide—acrylic acid copolymers, by preparing a solution of acrylic acid in water, wherein the mass ratio acrylic acid/water is from 95:5 to 70:30, preparing a solution of bio-acrylamide in water, wherein the mass ratio bio-acrylamide/water is from 60:40 to 10:90, mixing the two solutions, partially or fully neutralizing the acrylic acid functional groups, and polymerizing the resulting mixture.

It was the object of the present invention, to provide a process and a plant for manufacturing aqueous polyacrylamide gels, preferably in modular, relocatable plants suitable to control the risks of unintended polymerization of acrylic acid and of acrylamide.

Accordingly, in a first embodiment, the present invention relates to process for making polyacrylamides by polymerizing an aqueous solution comprising at least acrylamide and acrylic acid or salts thereof in the presence of initiators for radical polymerization under adiabatic conditions, wherein the process comprises at least the following steps:

[1] Providing an aqueous solution of acrylic acid or salts thereof in at least one pressure-resistant storage tank (1) having a volume of 10 to 500 m$^3$, and comprising a heat-insulation layer and means for controlling the temperature of the aqueous solution, wherein the concentration of acrylic acid or their salts is from 2.5 mole/kg to 5 mole/kg of acrylic acid relating to the total of the aqueous solution, and wherein step [1] comprises at least the following sub-steps

[1.1] providing in a transport unit a first liquid chemical product selected from pure acrylic acid, or an aqueous solution of acrylic acid or a salt thereof having a concentration of more than 5 mol/kg of acrylic acid relating to the total of the aqueous solution,

[1.2] discharging the first liquid chemical product from the transport unit and diluting it with water in such a manner, that the resultant aqueous solution of acrylic acid or a salt thereof has a concentration from 2.5 mole/kg to 5 mole/kg of acrylic acid or salts thereof, relating to the total of the aqueous solution, and

[1.3] transferring said aqueous solution of acrylic acid or salts thereof having a concentration from 2.5 mole/kg to 5 mole/kg of acrylic acid or salts thereof, to the at least one pressure-resistant monomer storage tank (1), and

[2] providing an aqueous solution of acrylamide in at least one pressure-resistant storage tank (2) having a volume of 10 to 500 m$^3$ and comprising a heat-insulation layer, means for controlling the temperature of the aqueous solution, wherein the concentration of the aqueous solution is from 2.5 mole/kg to 5 mole/kg of acrylamide relating to the total of the aqueous solution, and wherein step [2] comprises at least the following sub-steps

[2.1] providing in a transport unit a second liquid chemical product which is an aqueous acrylamide solution having a concentration of more than 5 mol/kg of acrylamide, relating to the total of the aqueous solution, and

[2.2] discharging the second liquid chemical product from the transport unit and diluting it with water in such a manner, that the resultant aqueous acrylamide solution has a concentration from 2.5 mole/kg to 5 mole/kg of acrylamide relating to the total of the aqueous solution, and

[2.3] transferring said aqueous acrylamide solution to the at least one pressure-resistant monomer storage tank (2),

[3] preparing an aqueous monomer mix comprising at least water, acrylamide and partially or fully neutralized acrylic acid in a pressure-resistant mixing vessel (3) having a volume of 10 to 150 m$^3$, and comprising a heat-insulation layer and means for controlling the temperature of the aqueous monomer solution, wherein step [3] comprises at least the following sub-steps

[3.1] transferring an aqueous solution of acrylic acid or salts thereof from the pressure-resistant storage tank(s) (1) into the pressure-resistant mixing vessel (3),

[3.2] transferring an aqueous solution of acrylamide from the pressure-resistant storage tank(s) (2) into the pressure-resistant mixing vessel (3),

[3.3] optionally adding an aqueous base into the mixing vessel, while mixing the components in the pressure-resistant mixing vessel (3) and controlling the temperature of the mixture in the vessel (3) to maintain a temperature of not more than 40° C., wherein the amount of all monomers in the aqueous monomer mix is at least 2 moles/kg relating to the total of all components of the aqueous monomer mix, and

[4] transferring the aqueous monomer mix prepared in course of step [3] to a pressure-resistant polymerization unit (5) having a volume of 10 to 150 m$^3$ adding initiators for radical polymerization and polymerizing it under adiabatic conditions, thereby obtaining an aqueous polyacrylamide gel.

Preferably, in the process according to the first embodiment the pressure-resistant storage tank (1) has a design pressure of at least 4 bar gauge, the pressure-resistant storage tank (2) has a design pressure of at least 4 bar gauge, the pressure-resistant mixing vessel (3) has a volume of 10 to 50 m$^3$ and a design pressure of at least 8 bar gauge, and the pressure-resistant polymerization unit (5) has a design pressure of at least 4 bar gauge.

In a second embodiment, the present application relates to a plant for carrying out the abovementioned process.

With regard to the invention, the following can be stated specifically:

The process according to the present invention for making polyacrylamides as described herein may be described as "inherently safe process" and the plant accordingly may be described as "inherently safe plant". That is to say that unintended polymerization of acrylamide and/or acrylic acid may still happen in course of carrying out the process according to the present invention and by using the plant according to the present invention, however, the consequences are controllable: Pressure and heat generated by unintended polymerization in monomer storage tanks, monomer mixing units, neutralization units or polymerization units don't result in rupture of the tanks, but the mixture remains in the tanks and there is no spill out of the plant to the environment. Because only diluted aqueous solutions of acrylic acid are used in the process, it is not necessary to deal with the flammability of pure acrylic acid.

This is in particular important for the production of polyacrylamides in modular, relocatable plants which can be erected close to the site of use of the polyacrylamides, for example on an oilfield or in a mining area, i.e. in areas which don't comprise the typical safety infrastructure available at large, enclosed chemical areas.

Polyacrylamides

The term "polyacrylamides" as used herein means water-soluble copolymers comprising at least acrylamide and acrylic acid or salts thereof.

Optionally, the polyacrylamides may comprise further monoethylenically unsaturated, water-soluble monomers. The term "water-soluble monomers" in the context of this invention means that the monomers are to be soluble in the aqueous monomer solution to be used for polymerization in the desired use concentration. It is thus not absolutely necessary that the monomers to be used are miscible with water without any gap; instead, it is sufficient if they meet the minimum requirement mentioned. It is to be noted that the presence of acrylamide in the monomer solution might enhance the solubility of other monomers as compared to water only. In general, the solubility of the water-soluble monomers in water at room temperature should be at least 50 g/l, preferably at least 100 g/l.

Basically, the kind and amount of water-soluble, mono-ethylenically unsaturated comonomers which may be used besides acrylamide and acrylic acid is not limited. The may be selected depending on the desired properties and the desired use of the aqueous solutions of polyacrylamides to be manufactured.

Examples of monoethylenically unsaturated monomers comprise neutral comonomers such as methacrylamide, N-methyl(meth)acrylamide, N,N'-dimethyl(meth)acrylamide, N-methylol(meth)acrylamide or N-vinylpyrrolidone. Examples of anionic monomers comprise methacrylic acid, crotonic acid, itaconic acid, maleic acid or fumaric acid or salts thereof, vinylsulfonic acid, 2-acrylamido-2-methylpropanesulfonic acid (ATBS) or salts thereof. Examples of cationic monomers include ammonium derivatives of N-($\omega$-aminoalkyl)-(meth)acrylamides or of $\omega$-aminoalkyl (meth) acrylates such as 2-trimethylammonioethyl acrylate chloride $H_2C=CH-CO-CH_2CH_2N^+(CH_3)_3Cl^-$ (DMA3Q). Furthermore, associative monomers such as may be used as comonomers. Associative monomers impart hydrophobically associating properties to polyacrylamides. Associative monomers to be used in the context of this invention are water-soluble, monoethylenically unsaturated monomers having at least one hydrophilic group and at least one, preferably terminal, hydrophobic group. Examples of associative monomers have been described for example in WO 2010/133527, WO 2012/069478, WO 2015/086468 or WO 2015/158517.

In one embodiment, the polyacrylamides to be manufactured according to the present invention comprise 20 to 90% mole % of acrylamide and 10% to 80 mole % of acrylic acid and/or salts thereof, wherein the amounts of the monomers relate to the total of all monomers in the polymer. In one embodiment, the amount of arylamide and acrylic acid and/or salts thereof is at least 50 mole %, preferably at least 70 mole %, more preferably at least 80 mol % and in one embodiment, no further monomers are present besides acrylamide and acrylic acid or salts thereof.

In one embodiment, the polyacrylamides comprise 20 to 40 mole % of acrylamide and 60 to 80 mole % of acrylic acid and/or salts thereof.

In one embodiment, the polyacrylamides comprise 55 to 75 mole % of acrylamide and 25 to 45 mole % of acrylic acid and/or salts thereof.

In one embodiment, the polyacrylamides comprise 30 to 80 mole % by of acrylamide, 10 to 40 mole % of acrylic acid and/or salts thereof, and 5 to 20 mole % of ATBS and/or salts thereof.

In all specific embodiments mentioned above, the amount of the monomers relates to the total of all monoethylenically unsaturated monomers in the polyacrylamide. Further water-soluble, monoethylenically unsaturated monomers may be present besides those specifically mentioned, however, the embodiments each include also one embodiment in which besides the monomers specifically mentioned no further monomers are present, i.e. in these embodiments the total amount of the monomers specifically mentioned is 100% by weight.

The weight average molecular weight $M_w$ of the poly-acrylamides to be manufactured is selected by the skilled artisan according to the intended use of the polyacrylamides. For many applications high molecular weights are desirable. A high molecular weight corresponds to a high intrinsic viscosity (IV) of the polyacrylamides. In one embodiment of the invention, the intrinsic viscosity may be at least 15 deciliter/gram (dL/g). In one embodiment of the invention, the intrinsic viscosity is from 30 to 45 dl/g.

The numbers mentioned relate to the measurement with an automatic Lauda iVisc® LMV830 equipped with an Ubbelohde capillary tube and automatic injection. For the measurements an aqueous solution of the polymers to be analyzed was prepared having a concentration of 250 ppm. The pH was adjusted at 7 by means of a buffer and the solution comprised additionally 1 mol/l of NaCl. Further four dilutions were done automatically. The viscosity at five different concentrations was measured at 25° C. with. The IV value [dL/g] was determined in usual manner by extrapolating the viscosities to infinite dilution. The error range is about +/−2 dL/g.

Modular Plant

The plant for carrying out the process according to the present invention may be a fixed plant. However, in one embodiment of the invention, the plant is a modular, relocatable plant and the process according to the present invention is carried out by means of such a modular, relocatable plant.

Such a modular construction using relocatable units provides the advantage, that the plants may be easily relocated if polyacrylamides are no longer needed at one location but at another location. By the way of example, in enhanced oil recovery aqueous polyacrylamide solutions are injected into a subterranean, oil-bearing formations through one or more than one injection wells sunk into the formation. Such an injection may continue for months or even years. However, at some point in time no further oil production is possible. The modular plant may then be easily relocated to another location, for example to another oilfield. Furthermore, it is easy to expand or to reduce the capacity of a plant.

Examples of such relocatable units comprise units for storing and optionally cooling the monomers and other raw materials, mixing monomers, or polymerization. For carrying out the process according to the present invention individual units are connected with each other in a suitable manner thereby obtaining a production line.

"Relocatable unit" means that the unit is transportable basically as a whole and that is it not necessary to disassemble the entire unit into individual parts for transport. Transport may happen on trucks, railcars or ships.

In one embodiment, such modular, relocatable units are containerized units which may be transported in the same manner as closed intermodal containers for example on trucks, railcars or ships. Intermodal containers are large standardized (according to ISO 668) shipping containers, in particular designed and built for intermodal freight transport. Such containers are also known as ISO containers. Such ISO containers may have external dimensions of a height of ~2.59 m, a width of ~2.44 m and a length of ~6.05 m. Larger ISO containers have external dimensions of a height of ~2.59 m, a width of ~2.44 m and a length of ~12.19 m. There are of course other standards, for example units having modular dimensions of 12 feet (~3.66 m)×12 feet (~3.66 m)×12 feet (~3.66 m) or multiples thereof, e.g. 12 feet (~3.66 m)×12 feet (~3.66 m)×48 feet (~14.63 m).

In another embodiment, the relocatable units may be fixed on trucks or on trailers. With other words, for such relocatable units not a container or something similar is deployed, but the entire truck or the trailer including the unit in its loading spaces is deployed. The trucks or trailers advantageously also function as platform for the units on the ground. Also, two or more different units may be mounted together on a truck or trailer.

Detailed Description of the Process and the Plant

The process for making polyacrylamides according to the present invention comprises at least the steps [1] to [4].

It is one of the core features of the present invention, that acrylic acid and acrylamide are diluted with water after providing them to the plant and that they are stored as aqueous solutions. This is subject of process steps [1] and [2]. Step [3] describes mixing the monomer solution for polymerization, and step [4] describes the polymerization by adiabatic gel polymerization. Optionally, the process may comprise further process steps.

Step [1]—Providing an Aqueous Solution of Acrylic Acid Thereof

In course of step [1] of the process according to the present invention, an aqueous solution of acrylic acid or salts thereof is provided in at least one pressure-resistant storage tank (1) at the site of the plant. Having a certain storage capacity for the monomers available at the site of the plant is advisable in order to ensure an uninterrupted operation of the plant.

The pressure-resistant storage tank(s)(1) have a volume from 10 m³ to 500 m³, specifically from 10 to 200 m³, preferably from 30 m³ to 180 m³, for example from 60 to 80 m³ or from 120 to 180 m³, or from 120 to 160 m³. Their size is limited due to the condition that they are pressure-resistant. Larger tanks may technically be possible, however, for economic reasons it is better to limit their size. If a larger storage capacity is necessary, a plurality storage tanks may be used.

For modular, relocatable plants as mentioned above, the volume of the pressure-resistant storage tank(s)(1) should be in the range from 10 m² to 200 m², preferably from 30 m³ to 180 m³, for example from 60 to 80 m³ or from 120 to 180 m³, or from 120 to 160 m³. The pressure-resistant storage tanks (1) basically may have any shape and orientation. They preferably are cylindrical or have at least cylindrical sections and the storage tanks may be in horizontal or vertical orientation. In one embodiment, the storage tanks (1) may have a conical taper at the lower end.

In one embodiment, the pressure-resistant storage tanks (1) are horizontal cylinders comprising suitable means for deploying them in a horizontal manner, such as for instance a frame. Examples of such storage units comprise ISO tanks having for example a volume of about 75 m³.

If larger volumes need to be stored, a multiplicity of pressure-resistant storage tanks may be used. Advantageously, the storage tanks may be connected with each other, for example by pipes, so that they can become filled and emptied together and furthermore, advantageously, only a single cooling unit may be used to cool all storage tanks together. In one embodiment, a stack of 2 to 4 of the ISO tanks mentioned above many be used.

In another embodiment, the pressure-resistant storage tank (1) is a vertical cylinder having a conical section at its lower end and a bottom valve for removing the liquids and furthermore legs or other means for deploying them vertically. Such a construction has the advantage that emptying can be affected simply by means of gravity. Such storage tanks may for example have a volume from 130 to 160 m³. If larger storage volumes are needed two or more of such tanks may be deployed side by side. As above the storage tanks advantageously may be connected with each other and there may be just one cooling unit of cooling cycle for all of the tanks.

The storage tank(s) (1) are pressure-resistant, which means that their design pressure is higher than 0 bar gauge. The unit "bar gauge" in known manner describes the pressure relating to atmospheric pressure. It may be converted to absolute pressures by adding the atmospheric pressure. Naturally, the design pressure is significantly lower than the bursting pressure of the tank.

The design pressure of the pressure-resistant storage tank(s) (1) may be at least 1 bar gauge, at least 2 bar gauge, at least 3 bar gauge, at least 4 bar gauge, at least 5 bar gauge, or at least 6 bar gauge. As a rule, the design pressure of the pressure-resistant storage tank(s) (1) does not exceed 12 bar gauge, preferably not 8 bar gauge, although exceptions are possible. So, the design pressure may be in the range from more than 0 bar gauge to 12 bar gauge, from more than 0 bar gauge to 8 bar gauge, from at least 1 bar gauge to 12 bar gauge or from at least 1 bar gauge to 12 bar gauge. Details about selecting the design pressure will be provided below.

In one preferred embodiment of the invention, the design pressure of the pressure-resistant storage tank(s) (1) is at least 4 bar gauge. Basically, the design pressure may be significantly higher than 4 bar gauge. However, for economic reasons the design pressure should not be too high, in particular, if the pressure-resistant storage tank (1) is a modular, relocatable unit. In one embodiment of the invention, the design pressure of the pressure-resistant storage tank(s)(1) is from 4 bar gauge to 12 bar gauge, for example from 4 bar gauge to 10 bar gauge, or from 4 bar gauge to 8 bar gauge, or from 4 bar gauge to 6 bar gauge.

As will be detailed below, the heat released in course of the polymerization of acrylic acid in an acrylic acid solution and the resulting temperature and pressure increase can be calculated using data from known tables. The higher the concentration, the higher the resulting temperatures and pressure. So, the specific design pressure may be selected according to the selected monomer concentration. The lower the monomer concentration, the lower the design pressure may be selected.

The monomer storage tank(s)(1) furthermore comprise a heat insulation layer which covers the outside of the tank(s)(1). Preferably, the entire outer surface (except for inlets and outlets) should be insulated, but within the context of the present invention it shall be sufficient, if at least 70%, preferably at least 80%, more preferably at least 90% of the outer surface are covered with a heat insulation. The isolating layer may comprise any kind of insulation materials. In one embodiment, the tanks may comprise a heat insulation layer having a thickness from 5 cm to 15 cm, for example about 10 cm.

The pressure-resistant storage tanks (1) furthermore comprise means for controlling the temperature of the solution of acrylic acid or salts thereof in the tanks. As a rule, the temperature of the solution of acrylic acid or their salts should not exceed 25° C. to 30° C. In one embodiment, the temperature is adjusted at 30° C., preferably at 25° C., and more preferably at 20° C. Said temperatures relate to the temperature which should be adjusted by the means for controlling the temperature in course of normal operation. It goes without saying that the temperatures may become higher in case of operating trouble, such as for example a malfunction of the means for controlling the temperature.

Basically, any kind of means for controlling the temperature may be used. Means for controlling the temperature comprise internal cooling means and external cooling means. There may be individual cooling means for each of the pressure-resistant storage tanks (1). In other embodiments, a plurality of pressure-resistant storage tanks (1) may comprise a joint cooling cycle for controlling the temperature.

Step [1] comprises at least the process sub-steps [1.1], [1.2], and [1.3].

Step [1.1]

In course of step [1.1], a first liquid chemical product is provided to the plant for carrying out the process according to the present invention.

The first liquid chemical product is selected from pure acrylic acid (also known as "glacial acrylic acid"), or an aqueous solution of acrylic acid or a salt thereof having a concentration of more than 5 mol/kg of acrylic acid relating to the total of the aqueous solution.

In one preferred embodiment of the present invention, the first liquid chemical product is pure acrylic acid.

In other embodiments, the first liquid chemical product is an aqueous solution of acrylic acid or a salt thereof having a concentration of more than 5 mole/kg, preferably more than 10 mole/kg of acrylic acid or their salts relating to the total of the aqueous solution. Salts of acrylic acid comprise alkali metal salts, in particular the sodium salt. Further examples comprise ammonium acrylate.

The first liquid chemical products, i.e. pure acrylic acid or aqueous solutions thereof, or their salts, are transported to the plant in a transport unit. Examples of suitable transport units comprise tank trucks, railcars or tank containers.

In one embodiment of the invention, an aqueous solution of ammonium acrylate is used for carrying out the process according to the present invention. An aqueous solution of ammonium acrylate may be obtained by a biotechnological process, namely by enzymatic hydrolysis of acrylonitrile. In one embodiment of the present invention, ammonium acrylate for use in the process according to the present invention is manufactured in a bio-conversion unit located at the site of the plant.

Step [1.2]

In course of step [1.2], the first liquid chemical product is removed from the transport unit and diluted with water, thereby obtaining an aqueous solution of acrylic acid or a salt thereof has a concentration from 2.5 mole/kg to 5 mole/kg of acrylic acid or salts thereof, relating to the total of the aqueous solution. If ammonium acrylate is manufactured on-site as described above, ammonium acrylate can be directly discharged from the bio-conversion unit.

Water for dilution may be demineralized water. In other embodiments, water comprising salts may be used. Examples comprise weakly saline waters such as tap water or well water but also water having a higher salinity such as sea water may be used. Of course, also mixtures of different types of water may be used. In one embodiment of the invention, well water is used for dilution. Well water may have for example a total salinity from 500 ppm to 3000 ppm.

The dilution is carried out in such a manner that the resultant solution of aqueous acrylic acid or salts thereof has a concentration from 2.5 mole/kg to 5 mole/kg of acrylic acid relating to the total of the aqueous solution, preferably from 2.5 mol/kg to 4.5 mole/kg, for example from 3 to 4.2 mole/kg.

Maintaining an upper limit of 5 mole/kg ensures that in case of an unintended polymerization the temperature and pressure development is such that the contents of the tank remains in the pressure-resistant tank and there is no rupture of the tank. So, even in case of an unintended polymerization the contents of the pressure-resistant tank remain in the tank and cannot spill the environment. Maintaining a lower limit of 2.5 mole/kg makes sense for economic reasons, because not too much tank capacity needs to be installed. Furthermore, adiabatic polymerization does no longer work well, if the monomer concentration becomes too low.

Mixing acrylic acid and water basically can be carried out by any kind of mixing equipment. Continuous or discontinuous mixing technologies are possible. In course of diluting acrylic acid with water, heat of dilution is neglectable and needs not to be considered. The mixing equipment used comprises means for controlling and adjusting the monomer concentration in the desired range from 2.5 mole/kg to 5 mole/kg of acrylic acid or salts thereof. For example, flow meters may be used to measure flows of water and acrylic acid or salts thereof before mixing and the flows can be adjusted to meet the concentration requirements. The mixing equipment should also comprise an emergency shutdown in case the monomer concentration exceeds 5 mole/kg in order to avoid that an aqueous solution of acrylic acid have a concentration of more than 5 mole/kg enters into the pressure-resistant storage tank(s)(1).

Strictly ensuring, that solutions of acrylic acid having a concentration of more than 5 mole/kg or—in the worst case scenario—pure acrylic acid cannot enter into the pressure-resistant storage tank(s) (1) has the advantage that it is no longer necessary to monitor the acrylic acid solution at later stages of the process according to the present invention and to take measures against unintended polymerization. The combination of pressure-resistant tanks/vessels with limiting the concentration to not more than 5 mole/kg, preferably not more than 4.5 mole/kg results in that the tanks and vessels withstand the pressures and temperatures generated in course of unintended polymerization, i.e. there is no spill out of the plant into the environment.

In one embodiment of the invention, step [1.2] is carried out by continuously mixing a flow of the first liquid chemical product with a flow of water, thereby obtaining a flow of an aqueous solution of acrylic acid or salts thereof having a concentration from 2.5 mole/kg to 5 mole/kg, preferably from 2.5 mol/kg to 4.5 mole/kg, for example from 3 to 4.2 mole/kg. The obtained aqueous solution of acrylic acids or salts thereof is entered into the pressure-resistant monomer storage tank(s)(1). The streams may comprise flow meters and means for adjusting the desired concentration of the aqueous solution acrylic acid or salts thereof.

More specifically, step [1.2] may be carried out by discharging the first liquid chemical product from the transport unit by means of a pump and pumping a flow of the first liquid chemical product through a pipe to a mixing unit (4a), wherein the pipe is equipped with a flow meter for controlling the flow and a valve for adjusting the flow, discharging water from a water storage tank (6) by means of a pump and pumping a flow of water through a pipe to the mixing unit (4a), wherein the pipe is equipped with a flow meter for controlling the stream and a valve for adjusting the flow, mixing the flow of water with the flow of the first liquid chemical product in the mixing unit, adjusting the flow of water and the flow of the first liquid chemical product by means of the valves, thereby adjusting the concentration of the respective monomer to the desired value in the range from 2.5 mole/kg to 5 mole/kg, preferably from 2.5 mol/kg to 4.5 mole/kg, for example from 3 to 4.2 mole/kg of the respective monomer, and transferring the resultant stream of an aqueous acrylic acid solution or a salt thereof to the pressure-resistant monomer storage tank(s)(1).

The mixing unit (4a) may be any kind of mixing unit. In one embodiment, it comprises at least a T-fitting connecting the water pipe and the monomer pipe and a further pipe which is connected to the respective pressure-resistant monomer storage tank. In this embodiment mixing simply happens while the combined streams of water and acrylic acid stream through the pipe. In other embodiments, mixing may be supported by additional mixing elements. In one embodiment, the mixing unit additionally comprises a static mixer.

It is important for the present invention, to properly adjust the monomer concentration in the desired range from 2.5 mole/kg to 5 mole/kg, preferably from 2.5 mol/kg to 4.5 mole/kg, for example from 3 to 4.2 mole/kg by suitable measurement and control means. If this has been done, any undesired polymerization of monomers is no longer harmful, because the pressure resistant tanks and vessels used for the present invention withstand such an undesired polymerization without rupture. So, it is not necessary to control the concentration or polymerization conditions at later stages.

Step [1.3]

In course of step [1.3], the aqueous solution of acrylic acid or salts thereof having a concentration from 2.5 mole/kg to 5 mole/kg, preferably from 2.5 mol/kg to 4.5 mole/kg, for example from 3 to 4.2 mole/kg obtained in course of step [1.2] is transferred to the at least one pressure-resistant monomer storage tank (1). Step [1.3] is carried out after step [1.2], i.e. only readily mixed aqueous solutions of acrylic acid or salts thereof having a concentration from 2.5 mole/kg to 5 mole/kg enters into the monomer storage tank (1).

Step [2]—Provision of Acrylamide

In course of step [2] of the process according to the present invention, an aqueous solution of acrylamide is provided in at least one pressure-resistant storage tank (2) at the site of the plant, wherein the pressure-resistant storage tank (2) has a volume of 10 to 500 m³ and comprises a heat-insulation layer and means for controlling the temperature of the aqueous solution The pressure-resistant storage tank(s)(2) have the same construction as the pressure-resistant storage tank(s)(1) and we refer to their specification above, including preferred embodiments as described above.

In one preferred embodiment of the invention, the design pressure of the pressure-resistant storage tank(s) (2) is at least 4 bar gauge.

A second liquid chemical product is provided to the plant, wherein the second liquid chemical product is an aqueous acrylamide solution having a concentration of more than 5 mole/kg of acrylamide relating to the total of the aqueous solution, preferably from 5.5 mole/kg to 7.5 mole/kg, for example about 7 mole/kg. It is not possible to use pure acrylamide because pure acrylamide is a solid.

Step [2] comprises at least the process sub-steps [2.1], [2.2], and [2.3] which correspond to the respective steps [1.1], [1.2], and [1.3], except that the second liquid chemical product, i.e. an aqueous acrylamide solution is used instead of the first liquid chemical product, i.e. acrylic acid or an aqueous solution thereof, or the respective salts, as outlined above, including preferred embodiments.

For mixing a second mixing unit (4b) is used which technically corresponds to the mixing unit (4a) as described above for the first liquid chemical product.

In one embodiment of the invention, the second liquid chemical product. i.e. aqueous acrylamide solutions may be transported—in analogy to acrylic acid or aqueous solutions of acrylic acid or salts thereof- to the plant in a transport unit. Examples of suitable transport units have been mentioned above.

It is known in the art to synthesize acrylamide by partial hydrolysis of acrylonitrile using biocatalysts capable of converting acrylonitrile to acrylamide (the latter is also known as "bio acrylamide") and it also has already been suggested to manufacture bio acrylamide on-site, for example in the applications WO 2017/186697 A1, WO 2017/186698 A1, and WO 2017/186685 A1 mentioned above. So, in another embodiment, acrylamide for use in the process according to the present invention is provided in a bio-conversion unit located at the site of the plant and withdrawn from the bio-conversion unit for use in the process.

Further Monomers

Handling of further water-soluble, monoethylenically unsaturated monomers which may be used in the process according to the present invention depends on the hazard potential of the corresponding monomers. It should be noted that acrylamide (71.07 g/mole) and acrylic acid (72.06 g/mole) have a low molecular weight. The larger the molecular weight, the less the corresponding molar concentration and therefore, the less the hazard potential caused by undesired polymerization. The skilled artisan can easily calculate temperature and pressure increase resulting from polymerization.

If there is a hazard potential from undesired polymerization, additional water-soluble monoethylenically can be stored in the same manner as described above, i.e. as aqueous solutions in pressure-resistant monomer tanks, wherein the concentration of the monomers does not exceed 5 mole/kg. A dilution as described above is only necessary, if the monomer or the aqueous solution of the monomer provided to the plant has a concentration of more than 5 mole/kg.

2-acrylamido-2-methylpropanesulfonic acid (ATBS) is typically provided as a 50 wt. % aqueous solution of the corresponding sodium salt (229.2 g/mole). Such an aqueous solution has a molar concentration of 2.2 mole/kg only. It can be directly filled into pressure-resistant storage tanks as described above and it is not necessary to further dilute it.

2-trimethylammonioethyl acrylate chloride $H_2C=CH-CO-CH_2CH_2N^+(CH_3)_3Cl^-$ (DMA3Q, 193.7 g/mole) is typically provided as 80 wt. % aqueous solution. Such an aqueous solution has a molar concentration of 4.1 mole/kg. It can be directly filled into pressure-resistant storage tanks as described above and it is not necessary to further dilute it.

Solutions of large molecular weight monomers such as the abovementioned associative monomers which typically have an $M_n$>1000 g/mole need not to be stored in pressure-resistant tanks at all.

Step [3]—Preparing an Aqueous Monomer Solution for Polymerization

In course of step [3] an aqueous monomer mix for polymerization is prepared in a mixing vessel (3), wherein the monomer mix comprises at least water, acrylamide and partially or fully neutralized acrylic acid. It may optionally comprise further water-soluble, monoethylenically unsaturated monomers. The aqueous monomer mix is solution of the monomers as described.

The monomer mixing vessel (3) has a volume of 10 to 150 m$^2$, in particular from 10 to 50 m$^3$, for example from 10 to 40 m$^3$ or from 20 to 30 m$^3$. It may be single walled or double walled and it may be horizontal or vertical.

The monomer mixing vessel (3) furthermore may comprise a heat insulation layer which covers the outside of the monomer mixing vessel. Preferably, the entire outer surface (except for inlets and outlets) should be insulated, but within the context of the present invention it shall be sufficient, if at least 70%, preferably at least 80%, more preferably at least 90% of the outer surface are covered with a heat insulation. The isolating layer may comprise any kind of insulation materials. In one embodiment, the tanks may comprise a heat insulation layer having a thickness from 5 cm to 15 cm, for example about 10 cm.

The monomer mixing vessel (3) is pressure-resistant, i.e. it has a design pressure of more than 0 bar gauge. The design pressure of the monomer mixing vessel may be higher than that of the monomer storage tanks, because the monomer mixing vessel may also be used to neutralize acrylic acid with bases, and in a worst-case scenario heat generated by neutralization and heat generated by unintentional polymerization may be released simultaneously.

The design pressure of the monomer mixing vessel may be at least 1 bar gauge, at least 2 bar gauge, at least 3 bar gauge, at least 4 bar gauge, at least 5 bar gauge, at least 6 bar gauge, at least 7 bar gauge, or at least 8 bar gauge. A a rule, the design pressure of the monomer mixing vessel should not exceed 20 bar gauge, preferably not 12 bar gauge, although exceptions are possible. So, the design pressure may be in the range from more than 0 bar gauge to 20 bar gauge, from more than 0 bar gauge to 12 bar gauge, from at least 1 bar gauge to 20 bar gauge or from at least 1 bar gauge to 12 bar gauge. Details about selecting the design pressure will be provided below.

In one preferred embodiment of the invention, the monomer mixing vessel has a design pressure of at least 8 bar gauge. In one embodiment of the invention, the design pressure of the monomer mixing vessel is from 8 bar gauge to 20 bar gauge, for example from 8 bar gauge to 12 bar gauge.

The monomer mixing vessel (3) furthermore comprises means for controlling the temperature of the aqueous monomer solution. Usually, the temperature of the aqueous monomer solution should be not more than 30° C., preferably not more than 20° C., and in particular, the temperature is 5° C., for example from –5° C. to +5° C.

For cooling, the monomer mixing vessel (3) may comprise an external temperature control cycle comprising a pump which pumps the aqueous reactor contents from the monomer mixing vessel through a heat exchanger and back into the monomer mixing vessel, preferably via an injection nozzle.

The monomer mixing vessel (3) may be equipped with a stirrer for mixing the components of the aqueous monomer solution with each other. However, an external temperature control cycle may be used as means for mixing. The stream of the aqueous monomer mixture which passes through the temperature control cycle and which is injected back into the monomer make-up vessel causes a circulation of the aqueous reaction mixture within the reaction vessel which in many cases is sufficient to mix the aqueous reaction mixture.

Step [3] Comprises the Sub-Steps [3.1], [3.2], and Optionally [3.3].

In course of step [3.1], an aqueous solution of acrylic acid or salts thereof from the pressure-resistant storage tank(s) (1) into the pressure resistant mixing vessel (3).

In course of step [3.2] an aqueous solution of acrylamide from the pressure-resistant storage tank(s) (2) into the pressure resistant mixing vessel (3).

Step [3.3] is an optional step. It comprises adding an aqueous base into the mixing vessel. The aqueous base preferably is an aqueous solution of an alkali metal hydroxide, in particular an aqueous NaOH solution, for example an aqueous solution comprising 50 wt. % of NaOH. An aqueous base may be added to neutralize acrylic acid for polymerization at least partially. Neutralization of acrylic acid releases a significant amount of heat. If acrylic acid already is provided to the plant as a salt, for example as sodium acrylate or as ammonium acrylate, adding an aqueous base into the mixing vessel usually is not necessary although it still is possible.

Water may optionally be added to adjust the desired monomer concentration.

In one embodiment of the invention, the first liquid chemical product is pure acrylic acid or an aqueous solution of acrylic acid, and in course of step [3.3] an aqueous base is added into the pressure-resistant mixing vessel (3). The aqueous base preferably is an aqueous solution of an alkali metal hydroxide, in particular an aqueous NaOH solution, for example an aqueous solution comprising 50 wt. % of NaOH is additionally added into the pressure-resistant mixing vessel.

The amount of aqueous base to be used, if any, depends on the desired properties of the polyacrylamides to be manufactured. The acrylic acid may be fully neutralized, or it may only be partially neutralized. In particular, the pH value of the aqueous monomer mix solutions may be adjusted to a pH from 4 to 8, in particular from 4.5 to 7.5, for examples from 5 to 7.5 or from 5.5 to 7.

While carrying out the steps [3.1], [3.2], and [3.3], the contents of the pressure-resistant mixing vessel is mixed and the temperature controlled to maintain a temperature of not more than 40° C., preferably of not more than 30° C.

The order of carrying out step [3.1], [3.2], and [3.3] may be chosen by the skilled artisan. In one embodiment of the invention, an aqueous base, for example an aqueous NaOH solution is added into mixing vessel followed by adding an aqueous acrylic acid solution and finally adding an acrylamide solution while mixing the components and cooling. Of course, also another order of adding the components may be chosen.

Within the context of the present invention, the amount of all monomers is at least 2 mole/kg relating to the total of all components of the aqueous monomer mix, preferably at least 2.5 mole/kg. In particular, the concentration is from 2.5 to 5 mole/kg, preferably from 2.75 to 4.5 mole/kg, for example from 2.75 to 4 mole/kg or from 3 to 3.5 mole/kg.

Further additives which optionally might be present such as complexing agents, defoamers, surfactants, charge transfer agents, or stabilizers may also be added into the monomer mixing vessel, preferably as aqueous solutions.

Step [4]—Polymerization of the Aqueous Monomer Mix

In course of step [4] the aqueous monomer mix prepared in course of step [3] is polymerized in the presence of suitable initiators for radical polymerization under adiabatic conditions thereby obtaining an aqueous polyacrylamide gel.

Such a polymerization technique is also briefly denominated by the skilled artisan as "adiabatic gel polymerization". Reactors for adiabatic gel polymerization are unstirred. Due to the relatively high monomer concentration the aqueous monomer solution used solidifies in course of polymerization thereby yielding an aqueous polymer gel. The term "polymer gel" has been defined for instance by L. Z. Rogovina et al., Polymer Science, Ser. C, 2008, Vol. 50, No. 1, pp. 85-92.

"Adiabatic" is understood by the person skilled in the art to mean that there is no exchange of heat with the environment. This ideal is naturally difficult to achieve in practical chemical engineering. In the context of this invention, "adiabatic" shall consequently be understood to mean "essentially adiabatic", meaning that the reactor is not supplied with any heat from the outside during the polymerization, i.e. is not heated, and the reactor is not cooled during the polymerization. However, it will be clear to the person skilled in the art that certain amounts of heat can be released or absorbed via the reactor wall because of temperature gradients between the inside of the reactor and the outside, but this effect naturally plays an ever lesser role with increasing reactor size.

The polymerization of the aqueous monomer solution generates polymerization heat. Due to the adiabatic reaction conditions, the temperature of the polymerization mixture increases in course of polymerization.

The kind of polymerization unit for carrying out the present invention is not specifically limited. Preferably, the polymerization unit is a relocatable polymerization unit. It may be transported for instance by trucks or railcars.

The polymerization unit may be of cylindrical or conical shape. Preferably, the polymerization unit is cylindrical having a conical taper at the bottom and a bottom opening for removing the aqueous poly acrylamide gel. In one embodiment, there may be additionally a cylindrical section between the lower end of the conical taper and the bottom opening. The inner wall of the polymerization unit may preferably be coated with an anti-adhesive coating. Basically, anti-adhesive coatings are known in the art. Examples comprise polypropylene, polyethylene, epoxy resins and fluorine containing polymers such as polytetrafluoroethylene or perfluoroalkoxy polymers.

The polymerization unit has a volume of 10 to 150 m$^3$, preferably of 10 to 100 m$^2$, more preferably 10 to 40 m$^3$, for example of 20 m$^3$ to 30 m$^3$.

The polymerization unit is pressure-resistant, i.e. it has a design pressure of more than 0 bar gauge. It is to be noted, that the temperature of the contents of the polymerization reactor under the usual reaction conditions for adiabatic polymerization, should not exceed 100° C. and consequently, no excess pressure should be generated. The maximum temperature can be adjusted in usual manner by adjusting the monomer concentration and the starting temperature of the polymerization reaction. The starting temperature typically is less than 25° C., preferably less than 20° C., for example from −5° C. to +5° C.

The use of a pressure-resistant polymerization unit addresses the problem of unintentional polymerization following a malfunction, for example the start of polymerization of a monomer mixture having a temperature which is too high.

The design pressure of the pressure-resistant polymerization unit may be at least 1 bar gauge, at least 2 bar gauge, at least 3 bar gauge, at least 4 bar gauge, at least 5 bar gauge, or at least 6 bar gauge. A a rule, the design pressure of the polymerization unit should not exceed 12 bar gauge, preferably not 8 bar gauge, although exceptions are possible. So, the design pressure may be in the range from more than 0 bar gauge to 12 bar gauge, from more than 0 bar gauge to 8 bar gauge, from at least 1 bar gauge to 12 bar gauge or from at least 1 bar gauge to 12 bar gauge. Details about selecting the design pressure will be provided below.

In a preferred embodiment, the polymerization unit has a design pressure of at least 4 bar gauge. In one embodiment of the invention, the design pressure of the polymerization unit is from 4 bar gauge to 12 bar gauge, for example from 4 bar gauge to 10 bar gauge, or from 4 bar gauge to 6 bar gauge.

In another embodiment of the invention, neutralization of acrylic acid may be carried out-partly or fully—in the polymerization unit, so that heat of unintentional polymerization and neutralization is released simultaneously. Furthermore, one may consider a worst-case scenario, in which the contents of the monomer-mixing vessel (3) due to a malfunction of the plant unintentionally is transferred into the polymerization unit too early, i.e. before it has been cooled to remove the heat of neutralization.

In such a case, the design pressure of the polymerization unit needs to be selected to withstand the pressures which result not only from the polymerization heat but additionally also from neutralization. In particular, the design pressure may be at least 1 bar gauge, at least 2 bar gauge, at least 3 bar gauge, at least 4 bar gauge, at least 5 bar gauge, at least 6 bar gauge, at least 7 bar gauge, or at least 8 bar gauge. A a rule, the design pressure of the monomer mixing vessel should not exceed 20 bar gauge, preferably not 12 bar gauge, although exceptions are possible. So, the design pressure may be in the range from more than 0 bar gauge to 20 bar gauge, from more than 0 bar gauge to 12 bar gauge, from at least 1 bar gauge to 20 bar gauge or from at least 1 bar gauge to 12 bar gauge. Details about selecting the design pressure will be provided below.

Adiabatic polymerization is initiated in usual manner by adding initiators for radical polymerization. Suitable initiators for radical polymerization, in particular for adiabatic gel polymerization are known to the skilled artisan.

In a preferred embodiment, redox initiators are used for initiating. Redox initiators can initiate a free-radical polymerization even at temperatures of less than +5° C. Examples of redox initiators are known to the skilled artisan and include systems based on $Fe^{2+}/Fe^{3+}$—$H_2O_2$, $Fe^{2+}/Fe^{3+}$—alkyl hydroperoxides, alkyl hydroperoxides—sulfite, for example t-butyl hydroperoxide—sodium sulfite, peroxides—thiosulfate or alkyl hydroperoxides—sulfinates, for example alkyl hydroperoxides/hydroxymethane-sulfinates, for example t-butyl hydroperoxide—sodium hydroxymethanesulfinate.

Furthermore, azo initiators may be used. The azo initiators are preferably fully water-soluble, but it is sufficient that they are soluble in the monomer solution in the desired amount. Preferably, azo initiators having a 10 h $t_{1/2}$ in water of 40° C. to 70° C. may be used. The 10-hour half-life temperature of azo initiators is a parameter known in the art. It describes the temperature at which, after 10 h in each case, half of the amount of initiator originally present has decomposed. Examples of suitable azo initiators having a 10 h $t_{1/2}$ temperature between 40 and 70° C. include 2,2'-azobis[2-(2-imidazolin-2-yl)propane] dihydrochloride (10 h $t_{1/2}$ (water): 44° C.), 2,2'-azobis(2-methylpropionamidine) dihydrochloride (10 h $t_{1/2}$ (water): 56° C.), 2,2'-azobis[N-(2-carboxyethyl)-2-methylpropionamidine hydrate (10 h $t_{1/2}$ (water): 57° C.), 2,2'-azobis{2-[1-(2-hydroxyethyl)-2-imidazolin-2-yl]propane} dihydrochloride (10 h $t_{1/2}$ (water): 60° C.), 2,2'-azobis(1-imino-1-pyrrolidino-2-ethylpropane) dihydrochloride (10 h $t_{1/2}$ (water): 67° C.) or azobis(isobutyronitrile) (10 h $t_{1/2}$ (toluene): 67° C.).

In one embodiment of the invention a combination of at least one redox initiator and at least one azo initiator is used. The redox initiator efficiently starts polymerization already at temperatures below +5° C. When the reaction mixture heats up, also the azo initiators decompose and also start polymerization.

Selection of Design Pressures

As already outlined above, the process according to the present invention for making polyacrylamides as described herein may be described as "inherently safe process". That is to say that unintended polymerization of acrylamide and/or acrylic acid may still happen, however, pressure and heat generated in course of unintended polymerization in monomer storage tanks, in the monomer mixing tank or the polymerization unit don't result in rupture of the tanks, but the mixture remains in the tanks and there is no spill out of the plant to the environment.

Said result is achieved by a combination of two measures: Using pressure-resistant tanks and limiting the concentration of acrylic acid or salts thereof and of acrylamide, i.e. using aqueous solutions having a concentration from 2.5 mole/kg to 5 mole/kg, preferably from 2.5 mol/kg to 4.5 mole/kg, and for example from 3 to 4.2 mole/kg.

The pressure, which develops in a storage tank upon unintended polymerization of its contents shall be denominated in the following as "incident pressure". It goes without saying, that the design pressure of the tanks to be used for the process needs to be higher than the incident pressure in order to achieve the goal of an inherently safe process.

The incident pressure can be calculated on basis of tabulated thermodynamic data and formulae assuming 100% adiabatic polymerization as the worst-case scenario. The higher the concentration of acrylic acid or acrylamide, the higher the polymerization heat generated and the higher the incident pressure as vapor pressure. The incident pressure furthermore depends on the temperature of the monomer solution when unintended polymerization starts. The higher the temperature at the start of polymerization, the higher the incident pressure. In the monomer mixing tanks and optionally also in the polymerization unit, acrylic acid becomes at least partly neutralized with bases and consequently neutralization heat becomes released. So, for calculating the incident pressure for this case, also the neutralization heat needs to be taken into account. The worst-case scenario is an equimolar reaction of acid and base. The formulae for carrying out such calculations are outlined in the experimental part.

In normal operation, the temperature of acrylic acid or acrylamide in the monomer storage tanks is controlled to be ≤30° C., preferably at ≤25° C., for example ≤20° C. However, in order to arrive at the goal of an inherently safe plant, not the temperature of normal operation but the maximum temperature in assumed the worst-case-scenario needs to be regarded.

In one embodiment of the invention, a worst-case scenario is implied in which the cooling system of the tanks has a malfunction for a longer time and the tanks are exposed to intense sunlight also for a longer time, and—as a consequence—the temperature of the entire contents of the storage tank may increase—despite the fact that it is insulated-to up to 50° C. It goes without saying that said worst-case scenario may only happen in such regions of the earth with a hot climate and intense sunlight.

If the plant is located in regions of the earth having a cooler climate and less intense sunlight (e.g. in regions of moderate climate or in arctic regions) it is reasonable to assume, that the temperature does not increase that much, even in case the cooling system has a malfunction for a longer time. So, in other embodiments of the invention, a worst-case temperature of up to 40° C. or up to 25° C. is implied.

By the way of example, table 1 which follows lists certain embodiments of the present invention for three different worst-case scenarios. The skilled artisan will—following the information in this specification—be able to derive more suitable parameters.

TABLE 1

| Embodiments of the present invention | | | | | | |
|---|---|---|---|---|---|---|
| Design pressure of monomer tank (1) [barg] | Concentration of acrylic acid or salts thereof [mole/kg] | Design pressure of monomer tank (2) [barg] | Concentration of acrylamide [mole/kg] | Design pressure of monomer mixing vessel (3) [barg] | Design pressure of polymerization unit (5) [barg] | Suitable for worst-case temperature of |
| ≥6, preferably 6 to 8 | 2.5 to 5, preferably 4.5 to 5 | ≥6, preferably 6 to 8 | 2.5 to 5, preferably 4.5 to 5 | ≥15, preferably 15 to 20 | ≥15, preferably 15 to 20 | 50° C. |
| ≥4, preferably 4 to 6 | 2.5 to 4.5, preferably 4 to 4.5 | ≥4, preferably 4 to 6 | 2.5 to 4.5, preferably 4 to 4.5 | ≥11, preferably 11 to 15 | ≥11, preferably 11 to 15 | 50° C. |
| ≥3, preferably 3 to 4 | 2.5 to 4.2, preferably 3.5 to 4.2 | ≥3, preferably 3 to 4 | 2.5 to 4.2, preferably 3.5 to 4.2 | ≥11, preferably 11 to 15 | ≥11, preferably 11 to 15 | 50° C. |
| ≥1.5, preferably 1.5 to 2 | 2.5 to 3.5, preferably 3.0 to 3.5 | ≥1.5, preferably 1.5 to 2 | 2.5 to 3.5, preferably 3.0 to 3.5 | ≥5, preferably 5 to 8 | ≥5, preferably 5 to 8 | 50° C. |
| ≥4.5, preferably 4.5 to 6 | 2.5 to 5, preferably 4.5 to 5 | ≥4, preferably 4 to 6 | 2.5 to 5, preferably 4.5 to 5 | ≥11, preferably 11 to 15 | ≥11, preferably 11 to 15 | 40° C. |
| ≥3, preferably 3 to 4 | 2.5 to 4.5, preferably 4.0 to 4.5 | ≥3, preferably 3 to 4 | 2.5 to 4.5, preferably 4.0 to 4.5 | ≥8.5, preferably 8.5 to 12 | ≥8.5, preferably 8.5 to 12 | 40° C. |
| ≥2, preferably 2 to 3 | 2.5 to 4.2, preferably 3.5 to 4.2 | ≥2, preferably 2 to 3 | 2.5 to 4.2, preferably 3.5 to 4.2 | ≥7, preferably 7 to 10 | ≥7, preferably 7 to 10 | 40° C. |
| ≥1, preferably 1 to 2 | 2.5 to 3.5, preferably 3.0 to 3.5 | ≥1, preferably 1 to 2 | 2.5 to 3.5, preferably 3.0 to 3.5 | ≥3, preferably 3 to 6 | ≥3, preferably 3 to 6 | 40° C. |
| ≥2.5 preferably 2.5 to 4 | 2.5 to 5, preferably 4.5 to 5 | ≥2.5 preferably 2.5 to 4 | 2.5 to 5, preferably 4.5 to 5 | ≥9 preferably 9 to 12 | ≥9 preferably 9 to 12 | 25° C. |
| ≥1.5 preferably 1.5 to 2 | 2.5 to 4.5, preferably 4.0 to 4.5 | ≥1.5 preferably 1.5 to 2 | 2.5 to 4.5, preferably 4.0 to 4.5 | ≥5.5 preferably 5.5 to 8 | ≥5.5 preferably 5.5 to 8 | 25° C. |
| ≥1 preferably 1 to 2 | 2.5 to 4.2, preferably 3.5 to 4.2 | ≥1 preferably 1 to 2 | 2.5 to 4.2, preferably 3.5 to 4.2 | ≥5 preferably 5 to 7 | ≥5 preferably 5 to 7 | 25° C. |

Further Process Steps

The process according to the present invention yields an aqueous polyacrylamide gel, wherein the polyacrylamide comprises at least acrylamide and acrylic acid and/or a salt thereof. It may be further processed in various manners. In one embodiment of the invention, the aqueous polyacrylamide gel is removed from the polymerization reactor and dried, thereby obtaining a dry polyacrylamide powder.

Preferably, the aqueous polyacrylamide gel is not dried but used as such. The aqueous polyacrylamide gel may be dissolved in water and the aqueous solution used. As already outlined above, the plant according to the present invention preferably is a modular, relocatable plant which may be located on-site, i.e. at or a least close to the site where polyacrylamides are used, such as for example on an oilfield or in a mining area.

In one embodiment, the process according to the present invention additionally comprises at least the following process steps:

[5] removing the aqueous polyacrylamide gel from the polymerization unit, and

[6] comminuting the aqueous polyacrylamide gel and mixing it with an aqueous liquid, thereby obtaining an aqueous polyacrylamide composition having a concentration of 0.01 to 14.9% by weight of polyacrylamides, relating to the total of all components of the aqueous polyacrylamide composition.

Basically, step [5] can be carried out by any kind of technology. The details depend on the specific design of the polymerization unit and the connected downstream processing equipment. Preferably, the aqueous polyacrylamide gel may be removed by applying pressure onto the gel and pressing it through an opening in the polymerization unit. By the way of example, pressure may be generated by mechanical means such as a piston, by means of gases such as compressed air, nitrogen, argon or by means of aqueous fluids, in particular water. Such a technology in particular is advantageous for the preferred polymerization unit being cylindrical and having a conical taper at the bottom and a bottom opening for removing the aqueous polyacrylamide gel.

Comminuting and mixing the aqueous polyacrylamide gel with an aqueous liquid in course of step [6] may be carried out simultaneously, or they may be separate steps to be carried out consecutively or any other combination, i.e. that already some aqueous liquid is added in course of comminution are more aqueous liquid thereafter. Preferably, at least some amount of aqueous liquid should be added already in course of comminution.

The aqueous liquid used for mixing with the aqueous polyacrylamide gel comprises water. The term "water" includes any kind of water such as desalinated water, fresh water or water comprising salts, such as brines, sea water, formation water, produced water or mixtures thereof. Besides water, the aqueous liquid may comprise organic solvents miscible with water, however the amount of water relating to the total of all solvent should be at least 70% by weight, preferably at least 90% by weight, more preferably at least 95% by weight. Furthermore, the aqueous liquid may optionally also comprise additives such as for example surfactants, complexing agents, biocides, bases, acids of the like. Kind and amount of such additives may be selected according to the intended use of the aqueous polyacrylamide solution and/or intended further reactions. Of course, additives may also be added at a later stage, for example after complete dissolution of the aqueous polyacrylamide gel.

Basically, any kind of comminution means may be used for disintegrating the aqueous polyacrylamide gel into smaller particles. Examples of suitable means for comminuting aqueous polyacrylamide gels include cutting devices such as knives or perforated plates, crushers, kneaders, static mixers or water-jets. Suitable comminution units may be connected directly with the polymerization unit. In other embodiments, the comminution unit may not be directly connected with the polymerization unit but distant from it and the polyacrylamide gel is transported to the comminution unit, for example by screw conveyors, belt conveyors, or pumps.

Devices and processes of comminuting aqueous polyacrylamide gels have been disclosed in detail in WO 2019/081327 A1, page 46, line 40 to page 57, line 35. Devices and processes of mixing comminuted aqueous polyacrylamide gels have been disclosed in detail in WO 2019/081327 A1, page 57, line 37 to page 60, line 29. We explicitly refer to said passages.

The concentration of the aqueous polyacrylamide composition to be obtained in course of step [6] may be selected by the skilled artisan according to the intended use of the composition. Their concentration is from 0.01 to 14.9% by weight, preferably from 0.01 to 7% by weight.

In one embodiment, the compositions have a concentration from 0.01 to 2% by wt., for example from 0.1% to 1% by wt. Other embodiments comprise more concentrated compositions, for example having a concentration from 2.1% to 7% by wt., for example from 3.1% to 6% by weight. Such compositions may be characterized as solid solutions, however, they are still pumpable. The compositions usually are homogeneous.

In one embodiment, the described process comprising the process steps [5] and [6] comprises additionally at least the following steps:

[7] transporting the aqueous polyacrylamide composition in a transport unit having a volume from $1 \text{ m}^3$ to $40 \text{ m}^3$ by transport means selected from the group of trucks, railcars or ships from the manufacturing site (location A) to a different location B, and

[8] removing the aqueous polyacrylamide composition from the transport unit at the location B. The manufacturing site or location A is the site at which the process steps [1] to [4] are carried out. Location B preferably may be a site-of-use, i.e. a location at which polyacrylamides are used or at least a location close to such a site-of-use. Location B may for example by at an oil and/or gas well to treated with polyacrylamides. Location A is apart from location B and may for example be a more central point on an oilfield which serves a larger number of locations B with polyacrylamides, in particular aqueous polyacrylamide compositions.

In course of step [7], the aqueous polyacrylamide compositions are transported from location A to location B.

For transport, a suitable transport unit is used. The transport unit may have a volume from $1 \text{ m}^3$ to $40 \text{ m}^3$, in particular from $5 \text{ m}^3$ to $40 \text{ m}^3$, preferably 10 to $30 \text{ m}^2$, for example $20 \text{ m}^3$ to $30 \text{ m}^3$ or from 15 to $25 \text{ m}^3$. Examples of suitable transport units comprise vessels comprising at least one opening, tank containers, or tipping vessels. The transport may be carried out by any kind of transport means suitable for transporting the transport unit, for example by trucks, railcars or ships.

Filling the transport unit with the aqueous polyacrylamide concentrate may be carried out by pumping the concentrate into the transport unit.

In course of step [8] the aqueous polyacrylamide concentrate is removed from the transport unit. Step [8] is carried out at location B.

Basically, removing the aqueous polyacrylamide compositions may be carried out by any kind of technology. Preferably, the aqueous polyacrylamide compositions may be removed by means of a pump.

After removal form the transport unit, the aqueous polyacrylamide compositions may be directly used. In other embodiments, the aqueous polyacrylamide compositions may be transferred into suitable storage units, for example storage tanks for temporarily storing it before use.

In another embodiment, in the process according to the present invention comprising the process steps [1] to [4] a transportable polymerization unit is used, and the process comprises additionally the following process steps:

[5a] transporting the polymerization unit filled with the aqueous polyacrylamide gel from the manufacturing site (location A) to a different location B,

[6a] removing the aqueous polyacrylamide gel from the transportable polymerization unit at the location B,

[7a] comminuting and mixing the aqueous polyacrylamide gel in an aqueous liquid at the location B, thereby obtaining an aqueous polyacrylamide composition, having a concentration of 0.01 to 14.9% by weight of polyacrylamides, relating to the total of all components of the aqueous polyacrylamide composition.

For carrying out step [5a], basically any kind of polymerization unit may be used, provided it is transportable. Preferably, it is a polymerization unit which can be loaded on a truck or on a railcar. In one embodiment, a transportable polymerization unit for use in the present invention comprises a cylindrical upper part, a conical part at its lower end, and a bottom opening at the lower part which may be opened and closed and through which the aqueous polyacrylamide gel is removed. It furthermore comprises means such as legs or similar elements allowing to deploy the relocatable polymerization unit in a vertical manner.

In course of step [5a], polymerization unit filled with the aqueous polyacrylamide gel from location A to a location B as defined above.

At the location B, the aqueous polyacrylamide gel is removed for the polymerization unit followed by comminution and mixing the aqueous polyacrylamide gel with an aqueous liquid as already defined above.

Steps [6a] and [7a] correspond to steps [5] and [6] as already described above and we refer to the abovementioned. It is the only difference, that steps [6a] and [7a] are carried out at another location B after transporting the polymerization unit while steps [5] and [6] don't require such a prior transport step.

Plant for Carrying Out the Process

In another embodiment, the present invention relates to a plant, preferably a modular, relocatable plant for manufacturing polyacrylamides by polymerizing an aqueous solution comprising at least acrylamide and partially or fully neutralized acrylic acid under adiabatic conditions thereby obtaining an aqueous polyacrylamide gel, comprising at least at least one storage tank for water (6), at least one pressure-resistant storage tank (1) for an aqueous solution of acrylic acid or a salt thereof, having a volume of 10 to 500 m$^3$ and a design pressure of at least 4 bar gauge and comprising a heat insulation layer and means for controlling the temperature of the aqueous solution, at least one pressure-resistant storage tank (2) for an aqueous acrylamide solution having a volume of 10 to 500 m$^3$ and a design pressure of at least 4 bar gauge and a heat insulation layer and comprising means for controlling the temperature of the aqueous solution, means for discharging a first liquid chemical product selected from pure acrylic acid or an aqueous solution of acrylic acid or a salt thereof from a transport unit and mixing it with water discharged from the storage tank for water (6) by means of a mixing unit (4a), thereby obtaining an aqueous solution of acrylic acid or a salt thereof, and means for transferring the aqueous solution obtained to the pressure-resistant storage tank (1), means for discharging a second liquid chemical product which is an aqueous acrylamide solution from a transport unit, and mixing it with water discharged from the storage tank for water (6) by means of a mixing unit (4b), thereby obtaining an aqueous acrylamide solution, and means for transferring the aqueous acrylamide solution obtained to the pressure-resistant storage tank (2), a pressure-resistant mixing vessel (3) for preparing an aqueous monomer mix comprising at least water, acrylamide and partially or fully neutralized acrylic acid, having a design pressure of at least 8 bar gauge and having a volume of 10 to 40 m$^3$, means for transferring an aqueous solution of acrylic acid or salts thereof from the pressure-resistant storage tank(s) (1) to the pressure-resistant mixing vessel (3), means for transferring an aqueous solution of acryl amide from the pressure-resistant storage tank(s) (2) to the pressure-resistant mixing vessel (3), at least pressure-resistant polymerization unit (5) having a volume of 10 to 40 m$^3$ and a design pressure of at least 4 bar gauge, and means for transferring the aqueous monomer mix from the pressure-resistant mixing vessel (3) to the pressure-resistant polymerization unit (5).

In one embodiment, the plant furthermore comprises at least one storage tank for an aqueous base (7), and means for transferring the aqueous base from the storage tank(s) for the aqueous base (7) to pressure-resistant mixing vessel (3).

Preferably, the mixing unit (4a) comprises a first inlet pipe connecting the mixing unit (4a) with the storage tank for water (6) comprising a pump, a second inlet pipe connecting the mixing unit (4a) with the transport unit for the first liquid chemical product comprising a pump, and an outlet pipe connecting the mixing unit (4a) with the pressure-resistant monomer storage tank (1), wherein each of the inlet pipes furthermore is equipped with a flow meter for controlling the flow through the pipe and a valve for adjusting the flow through the pipe, and wherein the mixing unit (4b) comprises a first inlet pipe connecting the mixing unit (4b) with the storage tank for water (6) comprising a pump, a second inlet pipe connecting the mixing unit (4b) with the transport unit for the second liquid chemical product comprising a pump, and an outlet pipe connecting the mixing unit (4b) with the pressure-resistant monomer storage tank (1), wherein each of the inlet pipes furthermore is equipped with a flow meter for controlling the flow through the pipe and a valve for adjusting the flow through the pipe.

In one embodiment, the mixing units (4a) and (4b) each comprise at least a T-fitting connecting the water pipe, the monomer pipe and the pipe connecting to the respective pressure-resistant monomer storage tank. In another embodiment, the mixing unit additionally comprises a static mixer.

In one embodiment, the pressure-resistant polymerization unit (5) comprises a cylindrical upper part, a conical part at its lower end, feeds for the aqueous monomer solution and a bottom opening for removing the polyacrylamide gel.

Details of the individual units of the plant, including preferred embodiments have already been described above and we refer to the respective passages.

Use of the Polyacrylamides

The polyacrylamides manufactured according to the present invention may be used for various purposes, for example for mining applications, oilfield applications, water treatment, waste-water cleanup, paper making or agricultural applications.

Advantages of the Present Invention

The present invention provides a process and a plant for manufacturing aqueous polyacrylamide gels suitable to control the risks of unintended polymerization of acrylic acid and of acrylamide. The process preferably can be carried out in modular, relocatable plants.

Acrylic acid or salts thereof and acrylamide are provided to the plant as pure acrylic acid or concentrated solutions of acrylic acid or acryl amide and diluted before storage at the site of the plant. They are stored at the site of the plant as aqueous solutions having a concentration of only 2.5 mole/kg to 5 mole/kg in pressure-resistant tanks. Also, the vessels for monomer make-up and for polymerization are pressure-resistant. If acrylic acid or acrylamide polymerize unintentionally, the pressure-resistant vessels withstand the temperature and pressure increase. The vessels don't burst and there in no spill of the environment. So, except for the first step of diluting the concentrated monomer solutions directly after providing the monomers to the plant, it is not necessary to monitor acrylic acid or acrylamide whether they might polymerize unintentionally and to take necessary measures.

Advantageously, in a modular plant, the tank or vessel which polymerized unintentionally, can be easily removed and substituted by a new module. So, even an unintended polymerization does not cause a longer interruption of the production.

EXAMPLES

The following examples are deemed to further illustrate the invention:

Part a Storage of Aqueous Solutions of Acrylic Acid and Acrylamide

The data and formulae for the calculations which follow are taken from "VDI Wärmeatlas, 10<sup>th</sup> Edt, Springer-Verlag Berlin Heidelberg 2006".

The vapor pressure of water was calculated according to the following formula of the "VDI Wärmeatlas", page Da 13:

$$\ln\frac{p_s}{p_c} = \frac{T_c}{T}\left[A\left(1 - \frac{T}{T_c}\right) + B\left(1 - \frac{T}{T_c}\right)^{1.5} + C\left(1 - \frac{T}{T_c}\right)^3 + D\left(1 - \frac{T}{T_c}\right)^6\right]$$

24 wherein the parameters have the following values:

| | |
|---|---|
| A | −7.71374 |
| B | 1.31467 |
| C | −2.51444 |
| D | −1.72542 |
| Tc | 647.1K |
| pc | 220.6 bar |

T is the temperature of the water, and $p_s$ is the vapor pressure at the temperature T.

Furthermore, the following parameters were used for the calculation:

| | | |
|---|---|---|
| Neutralization heat acrylic acid/NaOH (equimolar amounts) | h_neutr. | 58 kJ/mol |
| Polymerization heat of acrylic acid | h_poly_GAA | 78 kJ/mol |
| Sum of neutralization heat and polymerization heat | h_tot | 136 kJ/mol |
| Sum of neutralization heat and polymerization heat (other units) | h_tot_s | 1887 kJ/kg |
| Polymerization heat of acrylamide | h_poly_ACM | 81 kJ/mol |
| Polymerization heat of acrylamide (other units) | h_poly_ACM | 1140 kJ/kg |
| Molar weights | M_H₂O | 18 g/mol |
| | M_NaOH | 40 g/mol |
| | M_GAA | 72.06 g/mol |
| | M_ACM | 71.08 g/mol |
| Heat capacities | cp_H₂O | 4.2 kJ/kgK |
| | cp_NaOH | 1.5 kJ/kgK |
| | cp_GAA | 2.1 kJ/kgK |
| | cp_ACM | 2.6 kJ/kgK |

Example 1

Pressure and Temperature Development of an Aqueous Acrylic Acid Solution Upon Polymerization Using the formula and data as shown above the vapor pressure and temperature of an aqueous solution of acrylic acid after undesired polymerization was calculated. For the calculation, it was assumed that the polymerization takes place under ideal adiabatic conditions (i.e. there is no heat dissipation from the vessel), and that the polymerization proceeds to completion.

Table 2 shows the data for an initial temperature (i.e. the temperature of the aqueous acrylic acid solution before polymerization) of 25° C. In one embodiment of the present invention, the aqueous acrylic acid solutions are stored at 25° C., however, it is possible to store them also at higher temperatures, for example at 30° C. So, an initial temperature of 25° C. addresses a situation in which unintentional polymerization starts from a temperature at which the aqueous acrylic acid solution may be stored. The resulting pressures are also represented in FIG. 1.

Table 4 shows the data for an initial temperature of 50° C. A temperature of 50° C. relates to a worst-case-scenario assuming that the cooling system of a heat-insulated acrylic acid tank has a malfunction for a longer time and the insulated storage tank is exposed to intense sunlight also for a longer time so that the temperature of its contents increases significantly. The resulting pressures are also represented in FIG. 1.

Table 3 shows the data for an initial temperature of 40° C. An initial temperature of 40° C. relates to another worst-case-scenario assuming that the cooling system of an insulated acrylic acid tank has a malfunction for a longer time, however, the sunlight is not that intense to heat-up the storage tank completely to 50° C.

TABLE 2

Pressure and temperature of an aqueous solution of acrylic
acid upon polymerization, initial temperature 25° C.

| Acrylic acid concentration | | resulting pressure | resulting temperature |
|---|---|---|---|
| mol/kg | weight % | bar gauge | ° C. |
| 2.78 | 20 | 0 | 82.3 |
| 3.47 | 25 | 0 | 98.6 |
| 4.16 | 30 | 0.7 | 116 |
| 4.50 | 32.4 | 1.3 | 124.6 |
| 4.58 | 33 | 1.5 | 126.9 |
| 4.86 | 35 | 2.1 | 134.3 |
| 5.00 | 36 | 2.4 | 138.1 |
| 5.55 | 40 | 4.3 | 153.9 |
| 6.24 | 45 | 7.8 | 174.6 |
| 6.94 | 50 | 13.5 | 196.8 |
| 8.33 | 60 | 36.9 | 245.9 |
| 9.71 | 70 | 88.1 | 302.5 |

TABLE 3

Pressure and temperature of an aqueous solution of acrylic
acid upon polymerization, initial temperature 40° C.

| Acrylic acid concentration | | resulting pressure | resulting temperature |
|---|---|---|---|
| mol/kg | weight % | bar gauge | ° C. |
| 2.78 | 20 | 0 | 97.3 |
| 3.47 | 25 | 0.6 | 113.6 |
| 4.16 | 30 | 1.8 | 131.0 |
| 4.50 | 32.4 | 2.6 | 139.6 |
| 4.58 | 33 | 2.8 | 141.9 |
| 4.86 | 35 | 3.7 | 149.3 |
| 5.00 | 36 | 4.2 | 153.1 |
| 5.55 | 40 | 6.7 | 168.9 |

TABLE 4

Pressure and temperature of an aqueous solution of acrylic
acid upon polymerization, initial temperature 50° C.

| Acrylic acid concentration | | resulting pressure | resulting temperature |
|---|---|---|---|
| mol/kg | weight % | barg | ° C. |
| 2.78 | 20 | 0.3 | 107.3 |
| 3.47 | 25 | 1.2 | 123.6 |
| 4.16 | 30 | 2.7 | 141 |
| 4.50 | 32.4 | 3.7 | 149.6 |
| 4.58 | 33 | 4.0 | 151.9 |
| 4.86 | 35 | 5.1 | 159.3 |
| 5.00 | 36 | 5.7 | 163.1 |
| 5.55 | 40 | 8.8 | 178.9 |
| 6.24 | 45 | 14.4 | 199.6 |
| 6.94 | 50 | 23 | 221.8 |
| 8.33 | 60 | 54.8 | 270.9 |
| 9.71 | 70 | 123.8 | 327.5 |

Both, tables 2 and 4 demonstrate, that undesired polymerization of aqueous solutions of acrylic acid at higher concentrations still yields a very significant temperature and pressure increase. An aqueous solution of 70 wt. % of acrylic acid gives rise to a pressure of about 88 bar gauge and a temperature of about 300° C. upon polymerization when starting at 25° C. (table 2), and nearly 125 bar gauge and a temperature of about 330° C. when starting at 50° C. (table 4). Such high pressures and temperatures are sufficient to burst the vessels in which aqueous acrylic acid solutions are stored, even when pressure resistant vessels as defined in the present invention are used.

Diluting acrylic acid to 2.5 mole/kg to 5 mole/kg and storing it at such a concentration in the pressure-resistant storage tank(s) (1) as provided for in the present application significantly limits the temperature and pressure development. If an acrylic acid solution comprising 5 mol/kg of acrylic acid (36 wt. %) is stored at 25° C. the pressure in course of unintended polymerization increases to 2.4 bar gauge only. With an initial temperature of 50° C. the pressure increases to 5.7 bar gauge in course of polymerization. A storage tank having a design pressure of 6 barg would withstand such a pressure. If an acrylic acid solution comprising 4.5 mol/kg of acrylic acid is stored at 25° C., the resulting pressure remains at less than 1.5 barg only and even at a starting temperature of 50° C., the resulting pressure remains at less than 4 barg, so that storage tanks having a design pressure of at least 4 barg are sufficient for aqueous solutions of acrylic acid having such a concentration.

Example 2

Pressure and Temperature Development of an Acrylamide Solution Upon Polymerization In the same manner as explained above resulting pressures and temperatures were calculated for aqueous acrylamide solutions. As above, calculations were carried out for an initial temperature of 25° C., of 40° C. and of 50° C. The results are shown in tables 5, 6 and 7, and FIG. 2 shows the resulting pressures.

TABLE 5

Pressure and temperature of an aqueous solution of acryl
amide upon polymerization, initial temperature 25° C.

| Acryl amide concentration | | Resulting pressure | Resulting temperature |
|---|---|---|---|
| mol/kg | weight % | barg | ° C. |
| 2.81 | 20 | 0.0 | 83.7 |
| 3.52 | 25 | 0.0 | 99.8 |
| 4.22 | 30 | 0.8 | 116.9 |
| 4.50 | 32 | 1.2 | 123.9 |
| 4.57 | 32.5 | 1.4 | 125.6 |
| 4.92 | 35 | 2.1 | 134.6 |
| 5.00 | 35.5 | 2.3 | 136.4 |
| 5.06 | 36 | 2.4 | 138.2 |
| 5.63 | 40 | 4.2 | 153 |
| 6.33 | 45 | 7.4 | 172.4 |
| 7.03 | 50 | 12.3 | 192.6 |

TABLE 6

Pressure and temperature of an aqueous solution of acryl
amide upon polymerization, initial temperature 40° C.

| Acryl amide concentration | | Resulting pressure | Resulting temperature |
|---|---|---|---|
| mol/kg | weight % | barg | ° C. |
| 2.81 | 20 | 0 | 98.7 |
| 3.52 | 25 | 0.7 | 114.9 |
| 4.22 | 30 | 1.9 | 131.9 |
| 4.50 | 32 | 2.5 | 138.9 |
| 4.57 | 32.5 | 2.7 | 140.6 |
| 4.92 | 35 | 3.7 | 149.6 |

TABLE 6-continued

Pressure and temperature of an aqueous solution of acryl
amide upon polymerization, initial temperature 40° C.

| Acryl amide concentration | | Resulting pressure | Resulting temperature |
|---|---|---|---|
| mol/kg | weight % | barg | ° C. |
| 5.00 | 35.5 | 3.9 | 151.4 |
| 5.06 | 36 | 4.2 | 153.2 |

TABLE 7

Pressure and temperature of an aqueous solution of acryl
amide upon polymerization, initial temperature 50° C.

| Acryl amide concentration | | Resulting pressure | Resulting temperature |
|---|---|---|---|
| mol/kg | weight % | barg | ° C. |
| 2.81 | 20 | 0.4 | 108.7 |
| 3.52 | 25 | 1.3 | 125 |
| 4.22 | 30 | 2.8 | 141.9 |
| 4.50 | 32 | 3.6 | 148.9 |
| 4.57 | 32.5 | 3.8 | 150.6 |
| 4.92 | 35 | 5.1 | 159.6 |
| 5.00 | 35.5 | 5.4 | 161.4 |
| 5.06 | 36 | 5.7 | 163.2 |
| 5.63 | 40 | 8.6 | 178 |
| 6.33 | 45 | 13.7 | 197.4 |
| 7.03 | 50 | 21.1 | 217.6 |

The results are similar as with acrylic acid. If an acryl amide solution comprising 4.92 mol/kg of acrylic acid (35 wt. %) is stored at 25° C. the pressure in course of unintended polymerization increases to 2.1 barg only. With an initial temperature of 50° C. the pressure increases to 5.1 barg in course of polymerization. A storage tank having a design pressure of 6 barg would withstand such a pressure.

Example 3

Pressure and Temperature Development of an Aqueous Acrylic Acid Solution Upon Polymerization and Neutralization In course of step [3], i.e. the preparation of the aqueous monomer mix for polymerization, it is the worst-case scenario that acrylic acid unintentionally polymerizes in the same moment when it becomes neutralized with an NaOH solution (50 wt. % NaOH, used in equimolar amounts, i.e. complete neutralization), i.e. both, heat of polymerization and heat of neutralization are released simultaneously.

The vapor pressure and temperature of an aqueous solution of acrylic acid after undesired polymerization and neutralization was calculated as detailed above, including the heat of neutralization. It is important to note, that adding aqueous NaOH solution (50 wt. %) results in a dilution of the aqueous acrylic acid solution. Therefore, the acrylic acid concentration has been characterized as initial acrylic acid concentration in the table.

As above, three calculations were carried out, using initial temperatures of 25° C., 40° C. and 50° C. The results are shown in tables 8, 9 and 10, and in FIGS. 3 and 4.

TABLE 8

Pressure and temperature of an aqueous solution of acrylic acid with and
without neutralization upon polymerization, initial temperature 25° C.

| Initial acrylic acid concentration | | acrylic acid only | | with NaOH | |
|---|---|---|---|---|---|
| mol/kg | weight % | pressure [barg] | temperature [° C.] | pressure [barg] | temperature [° C.] |
| 2.78 | 20 | 0 | 82.3 | 0.6 | 114.1 |
| 3.47 | 25 | 0 | 98.6 | 2.1 | 135.1 |
| 4.16 | 30 | 0.7 | 116 | 4.5 | 155.5 |
| 4.50 | 32.4 | 1.3 | 124.6 | 5.1 | 159.5 |
| 4.86 | 35 | 2.1 | 134.3 | 8 | 175.5 |
| 5.00 | 36 | 2.4 | 138.1 | 8.9 | 179.5 |
| 5.55 | 40 | 4.3 | 153.9 | 13 | 195 |
| 6.24 | 45 | 7.8 | 174.6 | 19.7 | 214.1 |
| 6.94 | 50 | 13.5 | 196.8 | 28.4 | 232.8 |

TABLE 9

Pressure and temperature of an aqueous solution of acrylic acid with and
without neutralization upon polymerization, initial temperature 40° C.

| Initial acrylic acid concentration | | acrylic acid only | | with NaOH | |
|---|---|---|---|---|---|
| mol/kg | weight % | pressure [barg] | temperature [° C.] | pressure [barg] | temperature [° C.] |
| 2.78 | 20 | 0 | 97.3 | 1.2 | 123.4 |
| 3.47 | 25 | 0.6 | 113.6 | 2.9 | 143.0 |
| 4.16 | 30 | 1.8 | 131.0 | 6.5 | 162.1 |
| 4.50 | 32.4 | 2.6 | 139.6 | 8.1 | 171.2 |
| 4.86 | 35 | 3.7 | 149.3 | 9.2 | 180.8 |
| 5.00 | 36 | 4.2 | 153.1 | 10.1 | 184.5 |
| 5.55 | 40 | 6.7 | 168.9 | 14.3 | 199.1 |

TABLE 10

Pressure and temperature of an aqueous solution of acrylic acid with and
without neutralization upon polymerization, initial temperature 50° C.

| Initial acrylic acid concentration | | acrylic acid only | | with NaOH | |
|---|---|---|---|---|---|
| mol/kg | weight % | pressure [barg] | temperature [° C.] | pressure [barg] | temperature [° C.] |
| 2.78 | 20 | 0.3 | 107.3 | 2.2 | 135.5 |
| 3.47 | 25 | 1.2 | 123.6 | 4.5 | 155.6 |
| 4.16 | 30 | 2.7 | 141 | 8 | 175.3 |
| 4.5 | 32.4 | 3.7 | 149.6 | 10.1 | 184.5 |
| 4.86 | 35 | 5.1 | 159.3 | 12.8 | 194.5 |
| 5.00 | 36 | 5.7 | 163.1 | 14.0 | 198.2 |
| 5.55 | 40 | 8.8 | 178.9 | 19.3 | 213.2 |
| 6.24 | 45 | 14.4 | 199.6 | 27.8 | 231.5 |
| 6.94 | 50 | 23 | 221.8 | 38.4 | 249.4 |

Tables 8 to 10 clearly demonstrate, that the pressure and temperature increase in course of unintentional polymerization is significantly higher if concentrated NaOH is added to the acrylic acid solution as compared to the case in which only acrylic acid is present, because simultaneously the polymerization heat and neutralization heat become released. For that reason, the design pressure of the pressure-resistant mixing vessel needs to be higher than that of the pressure-resistant storage vessels.

Part B Polymerization

Manufacture of a copolymer comprising 75 mole % of acrylamide and 25 mole % of sodium acrylate by adiabatic gel polymerization (monomer concentration 23 wt. % regarding all components of the aqueous solution, scheduled quantity 3.5 kg)

General Polymerization Procedure

A 5 L beaker with magnetic stirrer, pH meter and thermometer was charged with 1600 g of distilled water, 702.04 g of sodium acrylate (35% by weight in water), and 1071.69 g of acrylamide (52% by weight in water). Then 10.5 g of diethylenetriamine-pentaacetic acid penta-sodium salt (Trilon C; 5% by weight in water), and 4 g of the stabilizer sodium 2-mercapto-benzothiazole (NaMBT; 50% by weight in water) were added.

After adjusting the pH value of the monomer solution to 6.4 with sulfuric acid (20% by weight in water) the desired monomer concentration of 23% by weight was adjusted by adding water (total amount of water 1690.08 g minus the amount of water already added, minus the amount of acid required), and the temperature of the monomer solution was adjusted approx. —3° C. The solution was transferred to a Dewar vessel, a sensor for recording the temperature was inserted, and the monomer solution in the Dewar vessel was purged with nitrogen for 45 minutes. The polymerization was initiated at 0° C. with 21 g of a 10% aqueous solution of 2,2'-azobis(2-methylpropionamidine) dihydrochloride (Wako V-50; 10 h $t_{1/2}$ in water 56° C.), 1.75 g of t-butyl hydroperoxide (1% by weight in water) and 1.05 g of a 1% sodium sulfite solution. With the onset of the polymerization, the temperature rose to >60° C. within about 60 min. A solid polymer gel block was obtained. After polymerization, the gel block was incubated 4 hours at 60° C. The block was cut into larger pieces and sealed in plastic bags until further testing.

Sample Preparation and Characterization Methods

Composition of pH 7 Buffer[2]* and pH 7 Buffer[1]*

A 5 L volumetric flask is charged with 583.3±0.1 g sodium chloride, 161.3±0.1 g disodium hydrogenphosphate•12H$_2$O, 7.80±0.01 g sodium dihydrogenphosphate•2H$_2$O and 4 L of distilled water. The solution is stirred until full dissolution and filled up to the 5 L graduation mark with distilled water. The pH value should be 7.0±0.1.

The concentrated pH 7 buffer[2]* solution was diluted 1:1 with distilled water to obtain the simple pH 7 buffer[1]*.

Dissolution Method

A 400 mL beaker was charged with 256.52 g of pH 7 buffer[1]* and 43.48 g of a 23% polymer gel, which was cut in tiny pieces, to obtain a stock solution with a specific concentration. The mixture with less than 1% concentration was stirred for 12 h with an overhead stirrer equipped with a paddle-type stirrer approx. 1.5 cm smaller than the diameter of the beaker. The mixing speed was 200 rpm. The evaporated water was replenished, and the solution stirred for additional 60 minutes. The solution was filtered over a 194 µm sieve prior to use. The mixture with more than 1% concentration was stirred on a tumble wheel.

The desired concentration for the specific measurement was obtained by a second dilution step using an overhead stirrer.

MPFR Determination

The polymer solution was diluted to 1000 ppm with pH 7 buffer[1]*. Subsequently this solution was stirred for 1 h at 200 rpm with the same overhead stirrer as described above. 200 mL of this polymer solution is placed into a Sartorius filtration cell equipped with a 5 µm polycarbonate nucleo pore filter (aka Millipore). After closure of the cell, 2 bar of air is applied and the weight of the filtrate measured over time. When the filtration is finished, the filtrate weight is plotted against the time of filtration and the deviation from linearity is calculated by regression analysis. Values<1.3 are within the specification for Modular Solution polymers.

Measurement of Brookfield RS Viscosity

A 5000 ppm solution was prepared. The viscosity was measured at room temperature with a Brookfield R/S device equipped with a 45 mm bob and cup geometry at a shear rate of 100 s$^{-1}$. An average value is taken after 3 minutes of measurement.

Error range: ±5 mPas.

Measurement of Intrinsic Viscosity

The polymer solution was diluted to 350 ppm with pH 7 buffer[1]* and injected either manually or automatically. Further four dilutions were done automatically. The viscosity at five different concentrations was measured at 25° C. with an automatic Lauda iVisc LMV830 equipped with an Ubbelohde capillary tube and manual injection, unless otherwise noted. The IV value [dL/g] was taken at infinite dilution. The error range is: ±2 dL/g.

Storing in Fresh Water

Comparative Example 1 (100% Acrylic Acid)

Pure 100% acrylic acid was stored for 4 weeks at ambient temperature, then neutralized with an aqueous NaOH solution (50 wt. %) and diluted with water to obtain a solution comprising 35 wt. % of sodium acrylate (3.72 mol/kg). The obtained solution was used for making a copolymer of sodium acrylate and acrylamide according to the general polymerization procedure as detailed above.

3 polymerizations were carried out.

The results and properties of the obtained polymer are shown in table 7.

Example 4 (35 wt. % Aqueous Solution of Acrylic Acid)

100% acrylic acid was diluted with desalinated water to obtain an aqueous acrylic acid solution comprising 35 wt. % of acrylic acid (4.86 g/mol). The obtained aqueous acrylic acid solution was stored at ambient temperature for 4 weeks. Thereafter, the solution was neutralized with an aqueous NaOH solution (50 wt. %) and used for making a copolymer of sodium acrylate and acrylamide according to the general polymerization procedure as detailed above. The amounts of water added were adjusted as compared to the general procedure to obtain a final concentration for polymerization of 23 wt. %. Except for that, the polymerization was carried out as described above.

The results and properties of the obtained polymer are shown in table 11.

Example 5 (30 wt. % Aqueous Solution of Acrylic Acid)

Example 5 was carried out as example 4, except that the acrylic acid was diluted to 30 wt. % (4.16 mol/kg) and stored for 4 weeks. The amounts of water used for making the monomer solution for polymerization were adjusted accordingly.

The results and properties of the obtained polymer are shown in table 11.

Example 6 (25 wt. % Aqueous Solution of Acrylic Acid)

Example 6 was carried out as example 4, except that the acrylic acid was diluted to 25 wt. % (3.47 mol/kg) and stored for 4 weeks. The amounts of water used for making the monomer solution for polymerization were adjusted accordingly.

The results and properties of the obtained polymer are shown in table 11.

TABLE 11

| | AA conc. in course of storage | $T_{max}$ [°C.] | Ø $T_{max}$ [°C.] | RS [mPas] | Ø RS [mPas] | $IV^a$ [dL/g] | MPFR | Ø MPFR |
|---|---|---|---|---|---|---|---|---|
| No. | | | | | | | | |
| C1 | 100% | 55.4 | 55.6 | 76 | 77 | — | 1.21 | 1.18 |
| | | 55.6 | | 80 | | — | 1.26 | |
| | | 55.9 | | 76 | | 32.1 | 1.07 | |
| 4 | 35% | 56.5 | 55.3 | 76 | 77 | — | 1.14 | 1.09 |
| | | 55.2 | | 75 | | 30.4 | 1.09 | |
| | | 54.2 | | 79 | | — | 1.05 | |
| 5 | 30% | 55.8 | 55.7 | 82 | 80 | — | 1.06 | 1.09 |
| | | 55.8 | | 79 | | 32.7 | 1.09 | |
| | | 55.6 | | 80 | | — | 1.11 | |
| 6 | 25% | 56.1 | 55.1 | 79 | 80 | — | 1.10 | 1.19 |
| | | 56.1 | | 77 | | 32.5 | 1.28 | |
| | | 53.2 | | 83 | | — | 1.19 | |

The results of comparative example 1 and the examples 4, 5, and 6 show, that the number of $T_{max}$ obtained in course of polymerization are—within typical ranges of error—the same and the same holds true for the viscosities and the MPFR of the copolymers obtained. So, diluting the acrylic acid and storing the diluted solution for 4 weeks does not negatively affect polymerization and also not the properties of the copolymer obtained.

Storing in Well Water

Storing of the monomers was also tested in well water. For the test a well water having the composition as shown in the following table 12 was used:

TABLE 12

Composition of the well water used (all data in mg/kg)

| $Cl^-$ | $NO_3^-$ | $SO_4^{2-}$ |
|---|---|---|
| 438.0 | 26.7 | 300.5 |

| Al | B | Ba | Ca | Fe | K | Li | Mg | Na | S | Si | Sr |
|---|---|---|---|---|---|---|---|---|---|---|---|
| 0.05 | 1.03 | 0.04 | 217.9 | 0.01 | 9.12 | 0.08 | 35.6 | 217.8 | 104.5 | 18.9 | 2.41 |

Comparative Example 2 (100% Acrylic Acid, No Storage, Desalinated Water)

Pure 100% acrylic acid was neutralized with an aqueous NaOH solution (50 wt. %) and diluted with water to obtain a solution comprising 35 wt. % of sodium acrylate (3.72 mol/kg). The obtained solution was used for making a copolymer of sodium acrylate and acrylamide according to the general polymerization procedure as detailed above.

3 polymerizations were carried out.

The results and properties of the obtained polymer are shown in table 13.

Comparative Example 3 (100% Acrylic Acid, No Storage, Well Water)

100% acrylic acid was neutralized with an aqueous NaOH solution (50 wt. %) and diluted with well water having the composition shown in table 12 to obtain a solution comprising 35 wt. % of sodium acrylate (3.72 mol/kg). The obtained solution was used for making a copolymer of sodium acrylate and acrylamide according to the general polymerization procedure as detailed above, except that well water was used.

3 polymerizations were carried out.

The results and properties of the obtained polymer are shown in table 13.

Example 7 (35 wt. % Acrylic Acid, 30 wt. % Acrylamide, Storage in Well Water)

100% acrylic acid was diluted with well water to obtain an aqueous acrylic acid solution comprising 35 wt. % of acrylic acid (4.86 g/mol). The obtained aqueous acrylic acid solution was stored at ambient temperature for 4 weeks.

An aqueous solution comprising 52 wt. % of acrylamide was diluted with well water to obtain an aqueous acrylamide acid solution comprising 30 wt. % of acryl amide (4.22 mole/kg). The obtained aqueous acrylamide solution was stored at ambient temperature for 4 weeks.

After 4 weeks, the acrylic acid solution was neutralized with an aqueous NaOH solution (50 wt. %). Both, the neutralized acrylic acid solution and the acrylamide solution were used for making a copolymer of sodium acrylate and acrylamide according to the general polymerization procedure as detailed above. The amounts of well water added were adjusted as compared to the general procedure to obtain a final concentration for polymerization of 23 wt. %. Except for that, the polymerization was carried out as described above. 3 polymerizations were carried out. The results and properties of the obtained polymer are shown in table 13.

Example 8 (30 wt. % Acrylic Acid, 30 wt. % Acrylamide, Storage in Well Water)

Example 8 was carried out as example 7, except that the acrylic acid was diluted to 30 wt. % (4.16 mol/kg). Acrylamide was diluted to 30 wt. % (4.22 mole/kg) in the same manner as in example 7. The amounts of well water used for making the monomer solution for polymerization were adjusted accordingly.

The results and properties of the obtained polymer are shown in table 13.

Example 9 (25 wt. % Acrylic Acid, 30 wt. % Acrylamide, Storage in Well Water)

Example 9 was carried out as example 7, except that the acrylic acid was diluted to 30 wt. % (3.47 mol/kg). Acrylamide was diluted to 30 wt. % (4.22 mole/kg) in the same manner as in example 7. The amounts of well water used for making the monomer solution for polymerization were adjusted accordingly.

The results and properties of the obtained polymer are shown in table 13.

TABLE 13

Results of comparative examples C2 and C3 and of examples 7, 8, and 9

| No. | Monomer concentration and storage | Water | $T_{max}$ [° C.] | Ø T [° C.] | RS [mPas] | Ø RS [mPas] | IV [dL/g] | MPFR | Ø MPFR |
|---|---|---|---|---|---|---|---|---|---|
| C2 | 100% AA | desalinated | 55.0 | 53.9 | 71 | 69 | 32.3 | 1.14 | 1.14 |
|  | no storage |  | 54.2 |  | 64 |  | 31.7 | 1.14 |  |
|  |  |  | 52.4 |  | 73 |  | 35.2 | 1.13 |  |
| C3 | 100% AA | well | 56.1 | 56.2 | 72 | 72 | 31.4 | — | — |
|  | no storage |  | 56.4 |  | 73 |  |  | — |  |
|  |  |  | 56.2 |  | 72 |  |  | — |  |
| 7 | 35% AA | well | 55.0 | 54.4 | 72 | 72 | 37.0 | 1.04 | 1.07 |
|  | 30% AM |  | 54.3 |  | 71 |  |  | 1.08 |  |
|  | 4 weeks storage |  | 53.9 |  | 73 |  |  | 1.08 |  |
| 8 | 30% AA | well | 58.0 | 56.8 | 72 | 72 | 36.0 | 1.04 | 1.05 |
|  | 30% AM |  | 55.1 |  | 70 |  |  | 1.00 |  |
|  | 4 weeks storage |  | 57.2 |  | 75 |  |  | 1.12 |  |
| 9 | 25% AA | well | 54.8 | 55.0 | 75 | 75 |  | 1.13 | 1.13 |
|  | 30% AM |  | 55.3 |  | 76 |  | 37.2 | 1.07 |  |
|  | 4 weeks storage |  | 54.9 |  | 75 |  |  | 1.18 |  |

The results show that the copolymers obtained by polymerization in well water show slightly higher Brookfield RS and intrinsic viscosities (IV) but the MPFR values are still sufficient (a number of more than 1.3 is usually no longer considered as sufficient). Storage of the monomers for 4 weeks in well water does not negatively affect the properties of the polymer obtained.

The invention claimed is:

1. Process for making polyacrylamides by polymerizing an aqueous solution comprising at least acrylamide and acrylic acid or salts thereof in the presence of initiators for radical polymerization under adiabatic conditions, wherein the process comprises:

[1] providing an aqueous solution of acrylic acid or salts thereof in at least one pressure-resistant storage tank (1) having a volume of 10 to 500 m³ and comprising a heat-insulation layer and means for controlling temperature of the aqueous solution in step [1], wherein a concentration of acrylic acid or their salts is from 2.5 mole/kg to 5 mole/kg relating to a total of the aqueous solution in step [1], and wherein step [1] comprises at least the following sub-steps

[1.1] providing in a transport unit a first liquid chemical product selected from pure acrylic acid, or an aqueous solution of acrylic acid or a salt thereof having a concentration of more than 5 mol/kg of acrylic acid relating to a total of the aqueous solution in step [1.1],

[1.2] discharging the first liquid chemical product from the transport unit and diluting it with water in such a manner, that a resultant aqueous solution in step [1.2] has a concentration from 2.5 mole/kg to 5 mole/kg of acrylic acid or salts thereof, relating to the total of the aqueous solution in step [1.2], and

[1.3] transferring said aqueous solution of acrylic acid or salts thereof having a concentration from 2.5 mole/kg to 5 mole/kg of acrylic acid or salts thereof in step [1.2], to the at least one pressure-resistant storage tank (1), and

[2] providing an aqueous solution of acrylamide in at least one pressure-resistant storage tank (2) having a volume of 10 to 500 m³ and comprising a heat-insulation layer, means for controlling temperature of the aqueous solution in step [2], wherein a concentration of the aqueous solution is from 2.5 mole/kg to 5 mole/kg of acrylamide relating to the total of the aqueous acrylamide solution in step [2], and wherein step [2] comprises at least the following sub-steps

[2.1] providing in a transport unit a second liquid chemical product which is an aqueous acrylamide solution having a concentration of more than 5 mol/kg of acrylamide, relating to the total of the aqueous acrylamide solution in step [2.1], and

[2.2] discharging the second liquid chemical product from the transport unit and diluting it with water in such a manner, that a resultant aqueous acrylamide solution has a concentration from 2.5 mole/kg to 5 mole/kg of acrylamide relating to the total of the aqueous acrylamide solution in step [2.2], and

[2.3] transferring said aqueous acrylamide solution in step [2.2] to the at least one pressure-resistant monomer storage tank (2),

[3] preparing an aqueous monomer mix comprising at least water, acrylamide and partially or fully neutralized acrylic acid in a pressure-resistant mixing vessel

35

(3) having a volume of 10 to 150 m³, comprising a heat-insulation layer and means for controlling temperature of the aqueous monomer mix, wherein step [3] comprises at least the following sub-steps

[3.1] transferring an aqueous solution of acrylic acid or salts thereof from the at least one pressure-resistant storage tank (1) into the pressure-resistant mixing vessel (3),

[3.2] transferring an aqueous solution of acrylamide from the at least one pressure-resistant storage tank (2) into the pressure-resistant mixing vessel (3),

[3.3] adding an aqueous base into the pressure-resistant mixing vessel, while mixing components in the pressure-resistant mixing vessel (3) and controlling temperature of the mixture in the vessel (3) to maintain a temperature of not more than 40° C., wherein an amount of all monomers in the aqueous monomer mix is at least 2 moles/kg, relating to the total of all components of the aqueous monomer mix, and

[4] transferring the aqueous monomer mix prepared in course of step [3] to a pressure-resistant polymerization unit (5) having a volume of 10 to 150 m³, adding initiators for radical polymerization and polymerizing the aqueous monomer mix under adiabatic conditions, thereby obtaining an aqueous polyacrylamide gel.

2. Process according to claim 1, wherein the pressure-resistant storage tank (1) has a design pressure of at least 4 bar gauge, the pressure-resistant storage tank (2) has a design pressure of at least 4 bar gauge, the pressure-resistant mixing vessel (3) has a volume of 10 to 50 m³ and a design pressure of at least 8 bar gauge, and the pressure-resistant polymerization unit (5) has a design pressure of at least 4 bar gauge.

3. Process according to claim 1, wherein steps [1.2] and [2.2] are carried out by continuously mixing a flow of the respective liquid chemical product with a flow of water, thereby obtaining a flow of an aqueous monomer solution of acrylic acid or salt thereof in step [1.2] and aqueous monomer solution of acrylamide in step [2.2] which is filled into the respective pressure-resistant monomer storage tank.

4. Process according to claim 1, wherein steps [1.2] and [2.2] are carried out by discharging the respective liquid chemical product from the transport unit by means of a pump and pumping a flow of the respective liquid chemical product through a pipe to a mixing unit (4a) or (4b), wherein the pipe is equipped with a flow meter for controlling the flow and a valve for adjusting the flow, discharging water from a water storage tank by means of a pump and pumping a flow of water through a pipe to the mixing unit, wherein the pipe is equipped with a flow meter for controlling the flow of water and a valve for adjusting the flow, mixing the flow of water with the flow of the respective liquid chemical product in the mixing unit, adjusting the flow of water and the flow of the respective liquid chemical product by means of the valves, thereby adjusting the concentration of monomer of the respective liquid chemical product to the desired value in the range from 2.5 mole/kg to 5 mole/kg, and transferring the resultant monomer solution to the respective pressure-resistant monomer storage tank.

5. Process according to claim 4, wherein the mixing unit comprises at least a T-fitting connecting the water pipe and a monomer pipe and a further pipe which is connected to the respective pressure-resistant monomer storage tank.

6. Process according to claim 5, wherein the mixing unit additionally comprises a static mixer.

7. Process according to claim 1, wherein temperature of the aqueous solution of acrylic acid or salts thereof in the at least one pressure-resistant storage tank (1) and the aqueous solution of acrylamide in the at least one pressure-resistant storage tank (2) is maintained at ≤25° C.

8. Process according to claim 1, wherein a temperature of the aqueous monomer mix-in the pressure-resistant mixing vessel is maintained at ≤5° C.

9. Process according to claim 1, wherein the first liquid chemical product is pure acrylic acid or an aqueous solution of acrylic acid, and in step [3.3] an aqueous base is added into the pressure-resistant mixing vessel.

10. Process according to claim 1, wherein the concentration of all monomers in the aqueous monomer mix for polymerization is from 2.75 to 4.5 mole/kg, relating to the total of all components of the aqueous monomer mix.

11. Process according to claim 1, wherein the pressure-resistant polymerization unit has a volume from 10 to 40 m³.

12. Process according to claim 1, wherein the pressure-resistant polymerization unit comprises a cylindrical upper part, a conical part at its lower end, feeds for the aqueous monomer mix and a bottom opening for removing the polyacrylamide gel.

13. Process according to claim 1, wherein the process comprises additionally the following process steps:

[5] removing the aqueous polyacrylamide gel from the polymerization unit, and

[6] comminuting the aqueous polyacrylamide gel and mixing it with an aqueous liquid, thereby obtaining an aqueous polyacrylamide composition having a concentration of 0.01 to 14.9% by weight of polyacrylamides, relating to the total of all components of the aqueous polyacrylamide composition in step [6].

14. Process according to claim 13, wherein the process comprises additionally the following steps:

[7] transporting the aqueous polyacrylamide composition in a transport unit having a volume from 1 m³ to 40 m³ by transport means selected from the group of trucks, railcars or ships from a manufacturing site (location A) to a different location B, and

[8] removing the aqueous polyacrylamide composition from the transport unit in step [7] at the location B.

15. Process according to claim 13, wherein the concentration of the polyacrylamides in the aqueous polyacrylamide composition is from 3.1 wt. % to 7 wt. %, relating to the total of all components of the aqueous composition in step [6].

16. Process according to claim 1, wherein the pressure-resistant polymerization unit is a transportable pressure-resistant polymerization unit, and the process comprises additionally the following process steps:

[5a] transporting the pressure-resistant polymerization unit filled with the aqueous polyacrylamide gel from the manufacturing site (location A) to a different location B,

[6a] removing the aqueous polyacrylamide gel from the transportable pressure-resistant polymerization unit at the location B,

[7a] comminuting and dissolving the aqueous polyacrylamide gel in an aqueous liquid at the location B, thereby obtaining an aqueous polyacrylamide composition having a concentration of 0.01 to 14.9% by weight of polyacrylamides, relating to the total of all components of the aqueous polyacrylamide composition.

17. Process according to claim 1, wherein the pressure resistant storage tanks (1) and (2) have a volume from 10 to 200 m³ each.

18. Process according to claim 17, wherein the process is carried out in a modular, relocatable plant.

19. Process according to claim 1, wherein the pressure-resistant storage tank (1) has a design pressure of 6 bar to 8 bar gauge, and the concentration of the aqueous solution of acrylic acid or salts thereof in said pressure-resistant storage tank (1) is from 4.5 to 5 mole/kg, the pressure-resistant storage tank (2) has a design pressure of 6 to 8 bar gauge, and the concentration of the aqueous solution of acrylamide in said pressure-resistant storage tank (2) is from 4.5 to 5 mole/kg, the pressure-resistant mixing vessel (3) has a design pressure of 15 to 20 bar gauge, and the pressure-resistant polymerization unit (5) has a design pressure of 15 to 20 bar gauge.

20. Process according to claim 1, wherein the pressure-resistant storage tank (1) has a design pressure of 3 bar to 4 bar gauge, and the concentration of the aqueous solution of acrylic acid or salts thereof in said pressure-resistant storage tank (1) is from 3.5 to 4.2 mole/kg, the pressure-resistant storage tank (2) has a design pressure of 3 to 4 bar gauge, and the concentration of the aqueous solution of acrylamide in said pressure-resistant storage tank (2) is from 3.5 to 4.2 mole/kg, the pressure-resistant mixing vessel (3) has a design pressure of 11 to 15 bar gauge, and the pressure-resistant polymerization unit (5) has a design pressure of 11 to 15 bar gauge.

21. Process according to claim 1, wherein, the at least one pressure-resistant storage tank (1) has a design pressure of 2 bar to 3 bar gauge, and the concentration of the aqueous solution of acrylic acid or salts thereof in said pressure-resistant storage tank (1) is from 3.5 to 4.2 mole/kg, the at least one pressure-resistant storage tank (2) has a design pressure of 2 to 3 bar gauge, and the concentration of the aqueous solution of acrylamide in said pressure-resistant storage tank (2) is from 3.5 to 4.2 mole/kg, the pressure-resistant mixing vessel (3) has a design pressure of 7 to 10 bar gauge, and the pressure-resistant polymerization unit (5) has a design pressure of 7 to 10 bar gauge.

* * * * *